US 10,911,761 B2

United States Patent
Chen et al.

(10) Patent No.: US 10,911,761 B2
(45) Date of Patent: Feb. 2, 2021

(54) METHOD AND APPARATUS OF BILATERAL TEMPLATE MV REFINEMENT FOR VIDEO CODING

(71) Applicant: MEDIATEK INC., Hsin-Chu (TW)

(72) Inventors: Chun-Chia Chen, Hsinchu (TW);
Chih-Wei Hsu, Hsinchu (TW);
Tzu-Der Chuang, Hsinchu (TW);
Ching-Yeh Chen, Hsinchu (TW);
Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/473,328

(22) PCT Filed: Dec. 26, 2017

(86) PCT No.: PCT/CN2017/118531
§ 371 (c)(1),
(2) Date: Jun. 25, 2019

(87) PCT Pub. No.: WO2018/121506
PCT Pub. Date: Jul. 5, 2018

(65) Prior Publication Data
US 2020/0128258 A1     Apr. 23, 2020

Related U.S. Application Data

(60) Provisional application No. 62/469,048, filed on Mar. 9, 2017, provisional application No. 62/461,300, filed
(Continued)

(51) Int. Cl.
*H04N 19/176* (2014.01)
*H04N 19/105* (2014.01)
(Continued)

(52) U.S. Cl.
CPC ......... *H04N 19/176* (2014.11); *H04N 19/105* (2014.11); *H04N 19/139* (2014.11); *H04N 19/573* (2014.11); *H04N 19/577* (2014.11)

(58) Field of Classification Search
None
See application file for complete search history.

(56) References Cited

U.S. PATENT DOCUMENTS

| 2011/0176611 | A1* | 7/2011 | Huang | H04N 19/46 |
| | | | | 375/240.16 |
| 2014/0301463 | A1 | 10/2014 | Rusanovskyy et al. | |

(Continued)

FOREIGN PATENT DOCUMENTS

CN         105530516 A        4/2016

OTHER PUBLICATIONS

International Search Report dated Feb. 26, 2018, issued in application No. PCT/CN2017/118531.
(Continued)

*Primary Examiner* — Chikaodili E Anyikire
(74) *Attorney, Agent, or Firm* — Oblon, McClelland, Maier & Neustadt, L.L.P.

(57) ABSTRACT

Method and apparatus of using Bilateral Template MV Refinement are disclosed to improve coding efficiency or reducing complexity. According to one method, if a size associated with the current block is greater than a threshold, then Bilateral Template MV Refinement is applied to the current block. Otherwise, the Bilateral Template MV Refinement is not applied to the current block. In another method, the Bilateral Template MV Refinement is turned on or off implicitly based on the two reference blocks. According to yet another method, the Bilateral Template MV Refinement is performed on the sub-block level. According to yet another method, the Bilateral Template MV Refinement is
(Continued)

performed motion vectors selected from candidates of AMVP (advance MV prediction) candidate list. According to yet another method, the Bilateral Template MV Refinement used a modified template to refine motion vector.

7 Claims, 13 Drawing Sheets

Related U.S. Application Data on Feb. 21, 2017, provisional application No. 62/455,625, filed on Feb. 7, 2017, provisional application No. 62/445,831, filed on Jan. 13, 2017, provisional application No. 62/439,207, filed on Dec. 27, 2016, provisional application No. 62/439,203, filed on Dec. 27, 2016.

(51) Int. Cl.
*H04N 19/139* (2014.01)
*H04N 19/573* (2014.01)
*H04N 19/577* (2014.01)

(56) References Cited

U.S. PATENT DOCUMENTS

| 2015/0110178 | A1 | 4/2015 | Kim et al. | |
|---|---|---|---|---|
| 2016/0286232 | A1* | 9/2016 | Li | H04N 19/96 |
| 2016/0366415 | A1* | 12/2016 | Liu | H04N 19/70 |
| 2018/0070105 | A1* | 3/2018 | Jin | H04N 19/537 |

OTHER PUBLICATIONS

Chen, X., et al.; "Decoder-Side Motion Vector Refinement Based on Bilateral Template Matching;" Joint Video Exploration Team (JVET) of ITU-T SG 16 WP 3 and ISO/IEC JTC 1/SC 29/WG 11; Oct. 2016; pp. 1-4.

Jianle Chen et al: "Further improvements to HMKTA-1.1", 52. VCEG Meeting; Jun. 19, 2015-Jun. 26, 2015; Warsaw; (Video Coding Experts Group of ITU-T SG.16), No. VCEG-AZ07_v3, Jun. 25, 2015 (Jun. 25, 2015).

European Search Report dated Jun. 26, 2020 in EP Application No. 17889483.8.

\* cited by examiner

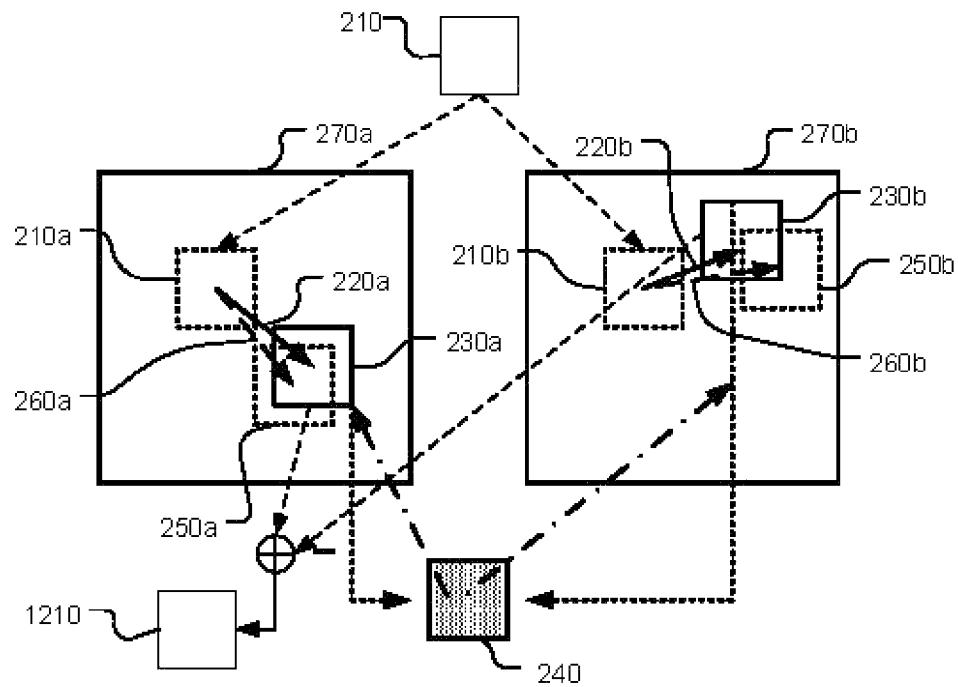

Fig. 12

```
Proposed Method
{
    Get the L0 Reference Block
    Get the L1 Reference Block
    Calculate the difference between L0 Reference Block and L1 Reference Block
    If (difference < threshold)     ← 1310
    {
        Do the Bilateral Template MV Refinement
1320    L0 MV of current PU = refined L0 MV
        L1 MV of current PU = refined L1 MV
    }
    else
    {
        Turn off the Bilateral Template MV Refinement, directly
1330    L0 MV of current PU = original L0 MV
        L1 MV of current PU = original L1 MV
    }
}
```

Fig. 13

METHOD AND APPARATUS OF BILATERAL TEMPLATE MV REFINEMENT FOR VIDEO CODING

CROSS REFERENCE TO RELATED APPLICATIONS

The present invention claims priority to U.S. Provisional Patent Application, Ser. No. 62/439,203, filed on Dec. 27, 2016, U.S. Provisional Patent Application, Ser. No. 62/439,207, filed on Dec. 27, 2016, U.S. Provisional Patent Application, Ser. No. 62/445,831, filed on Jan. 13, 2017, U.S. Provisional Patent Application, Ser. No. 62/455,625, filed on Feb. 7, 2017, U.S. Provisional Patent Application, Ser. No. 62/461,300, filed on Feb. 21, 2017 and U.S. Provisional Patent Application, Ser. No. 62/469,048, filed on Mar. 9, 2017. The U.S. Provisional Patent Applications are hereby incorporated by reference in their entireties.

TECHNICAL FIELD

The present invention relates to motion compensation using Bilateral Template MV Refinement to refine motion for a bi-direction predicted block. In particular, the present invention relates to various techniques to reduce bandwidth, to reduce computational complexity, to improve coding performance or a combination of them associated with the Bilateral Template MV Refinement process.

BACKGROUND

Motion estimation/compensation is a powerful coding tool that has been used in various coding standards such as MPEG-2, H.264 and the emerging HEVC (High Efficiency Video Coding) standard. The motion information derived at the encoder side has to be transmitted to the decoder side, which may consume sizeable bandwidth. In order to improve the coding efficiency for motion information, motion vector prediction (MVP) to coding a current motion vector (MV) predictively has been developed.

Merge Mode and AMVP Mode

For each Inter PU, one or two motion vectors (MVs) are determined using motion estimation. In order to increase the coding efficiency of motion vector (MV) coding in HEVC, HEVC motion vector prediction (MVP) to encode MV predictively. In particular, HEVC supports the Skip and Merge modes for MVP coding. For Skip and Merge modes, a set of candidates are derived based on the motion information of spatially neighbouring blocks (spatial candidates) or a temporal co-located block (temporal candidate). When a PU is coded using the Skip or Merge mode, no motion information is signalled. Instead, only the index of the selected candidate is coded. For the Skip mode, the residual signal is forced to be zero and not coded. In other words, no information is signalled for the residuals. Each merged PU reuses the MV, prediction direction, and reference picture index of the selected candidate.

For Merge mode in HEVC, up to four spatial MV candidates are derived from neighbouring blocks $A_0, A_1, B_0$ and $B_1$, and one temporal MV candidate is derived from bottom-right block, $T_{BR}$ or centre-block $T_{CT}$ as shown in FIG. 1. For the temporal candidate, $T_{BR}$ is used first. If $T_{BR}$ is not available, $T_{CT}$ is used instead. Note that if any of the four spatial MV candidates is not available, the block $B_2$ is then used to derive MV candidate as a replacement. After the derivation process of the four spatial MV candidates and one temporal MV candidate, removing redundancy (pruning) is applied to remove any redundant MV candidate. If after removing redundancy (pruning), the number of available MV candidates is smaller than five, three types of additional candidates are derived and are added to the candidate set (candidate list). The encoder selects one final candidate within the candidate set for Skip or Merge mode based on the rate-distortion optimization (RDO) decision, and transmits the index to the decoder.

Since the derivations of Skep and Merge candidates are similar, the "Merge" mode referred hereafter may correspond to "Merge" mode as well as "Skip" mode for convenience.

The MVP technique is also applied to code a motion vector predictively, which is referred as AMVP (Advanced Motion Vector Prediction). When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the AMVP scheme is used to select a motion vector predictor among an AMVP candidate set including two spatial MVPs and one temporal MVP. Therefore, an AMVP index for MVP and the corresponding MVDs need to be encoded and transmitted for an AMVP-coded block. In addition, the Inter prediction direction to specify the prediction directions among bi-prediction and uni-prediction (i.e., list 0 (L0) and/or list 1 (L1)) associated with the reference frame index for each list should also be encoded and transmitted.

When a PU is coded in either Skip or Merge mode, no motion information is transmitted except the Merge index of the selected candidate since the Skip and Merge modes utilize motion inference methods (i.e., MV=MVP+MVD where MVD being zero) to obtain the motion information from the selected Merge/Skip candidate.

In AMVP, the left MVP is selected based on the first available one from $A_0, A_1$, the top MVP is the first available one from $B_0, B_1, B_2$, and the temporal MVP is the first available one from $T_{BR}$ or $T_{CT}$ ($T_{BR}$ is used first, if $T_{BR}$ is not available, $T_{CT}$ is used instead). If the left MVP is not available and the top MVP is not scaled MVP, the second top MVP can be derived if there is a scaled MVP among $B_0, B_1$, and $B_2$. The list size of MVPs of AMVP is 2 in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.

Bilateral Template MV Refinement

Bilateral Template MV Refinement (BTMVR) is also referred as Decoder-side MV refinement (DMVR) in some literature. For example, in JVET-D0029 (Xu Chen, et al., "Decoder-Side Motion Vector Refinement Based on Bilateral Template Matching", Joint Video Exploration Team (JVET) of ITU-T SG 16 WP 3 and ISO/IEC JTC 1/SC 29/WG 11, 4th Meeting: Chengdu, CN, 15-21 Oct. 2016, Document: JVET-D0029), Decoder-Side Motion Vector Refinement (DMVR) based on bilateral template matching is disclosed. The process of BTMVR is shown in FIG. 2, where block 210 is a current block. Initial motion vectors MV0 220a and MV1 220b for current block 210 are determined. For example, the initial motion vectors may be derived from the Merge candidate. The BTMVR process is applied to a bi-predicted block. In other words, MV0 points to an L0 reference picture 270a and MV1 points to an L1 reference picture 270b. An L0 reference block 230a in L0 reference picture 270a can be located from the corresponding location 210a of the current block in L0 reference picture 270a and MV0 220a. Similarly, an L1 reference block 230b in L1 reference picture 270b can be located from the corresponding location 210b of the current block in L1 reference picture 270b and MV1 220b. A template 240 is generated by using the bi-prediction from the two reference blocks (230a and 230b) pointed by MV0 220a and MV1 220b respectively, as shown in FIG. 2. Using the template as a new current block and perform the motion estimation to find a better matching block (i.e., refined reference block 250a and refined reference block 250b) in L0 reference picture 260a and L1 reference picture 260b, respectively, as shown in FIG. 2. The refined MVs are referred as the MV0' 260a and MV1' 260b, as shown in FIG. 2. Then the refined MVs (MV0' and MV1') are used to generate a final bi-predicted prediction block for the current block.

In BTMVR (i.e., DMVR), it uses two-stage search to refine the MVs of the current block. For a current block, the cost of current MV candidate is first evaluated. In the first stage search, the integer-pixel search is performed around the current pixel location. Eight candidates are evaluated. The horizontal distance, vertical distance or both between two adjacent circles or between the square symbol and the adjacent circle is one pixel. The best candidate with the lowest cost is selected as the best MV candidate in the first stage. In the second stage, a half-pixel square search is performed around the best MV candidate in the first stage. The best MV candidate with the lowest cost is selected the final MV for the final motion compensation.

When the underlying video data correspond to colour video, the Bilateral Template MV Refinement process may also be applied to the colour components. As is known in the field, colour video may be in various colour format, such as YUV or YCrCb colour components with different colour sampling formats such as 4:4:4, 4:2:2 and 4:2:0. For example, when the colour vide0 is in the YCrCb420 format, the Cr and Cb chrominance components have half vertical resolution and half horizontal resolution of the Y luminance component. A motion vector derived based on the Y component needs to be scaled before the motion vector is used for the chrominance components.

When the Bilateral Template MV Refinement process is applied to colour video, the bi-lateral template generation is done in the luma (i.e., Y) pixel domain. For chroma encode/decode of current PU, it directly uses refined L0 MV and refined L1 MV of the luma component with chroma scaling for chrominance component based on the colour sampling:

$$MV \text{ for } Cb = \text{refined } MV \text{ for } Y/C\_scal\_Cb$$

$$MV \text{ for } Cr = \text{refined } MV \text{ for } Y/C\_scal\_Cr$$

In the above equations, C_scal_Cb and C_scal_Cr correspond to the chroma scaling factors for Cr and Cb respectively. In the case of 4:2:0 colour subsampling, C_scal_Cb and C_scal_Cr are equal to 2.

Pattern-Based MV Derivation (PMVD)

FIG. 3 illustrates an example of FRUC bilateral matching mode, where the motion information for a current block 310 is derived based on two reference pictures. The motion information of the current block is derived by finding the best match between two blocks (320 and 330) along the motion trajectory 340 of the current block in two different reference pictures (i.e., Ref0 and Ref1). Under the assumption of continuous motion trajectory, the motion vectors MV0 associated with Ref0 and MV1 associated with Ref1 pointing to the two reference blocks shall be proportional to the temporal distances, i.e., TD0 and TD1, between the current picture (i.e., Cur pic) and the two reference pictures Ref0 and Ref1.

FIG. 4 illustrates an example of template matching FRUC (Frame Rate Up Conversion) mode. The neighbouring areas (420a and 420b) of the current block 410 in a current picture (i.e., Cur pic) are used as a template to match with a corresponding template (430a and 430b) in a reference picture (i.e., Ref0 in FIG. 4). The best match between template 420a/420b and template 430a/430b will determine a decoder derived motion vector 440. While Ref0 is shown in FIG. 4, Ref1 can also be used as a reference picture.

According to VCEG-AZ07, a FRUC_mrg_flag is signalled when the merge_flag or skip_flag is true. If the FRUC_mrg_flag is 1, then FRUC_merge_mode is signalled to indicate whether the bilateral matching merge mode or template matching merge mode is selected. If the FRUC_mrg_flag is 0, it implies that regular merge mode is used and a merge index is signalled in this case. In video coding, in order to improve coding efficiency, the motion vector for a block may be predicted using motion vector prediction (MVP), where a candidate list is generated. A merge candidate list may be used for coding a block in a merge mode. When the merge mode is used to code a block, the motion information (e.g. motion vector) of the block can be represented by one of the candidates MV in the merge MV list. Therefore, instead of transmitting the motion information of the block directly, a merge index is transmitted to a decoder side. The decoder maintains a same merge list and uses the merge index to retrieve the merge candidate as signalled by the merge index. Typically, the merge candidate list consists of a small number of candidates and transmitting the merge index is much more efficient than transmitting the motion information. When a block is coded in a merge mode, the motion information is "merged" with that of a neighbouring block by signalling a merge index instead of explicitly transmitted. However, the prediction residuals are still transmitted. In the case that the prediction residuals are zero or very small, the prediction residuals are "skipped" (i.e., the skip mode) and the block is coded by the skip mode with a merge index to identify the merge MV in the merge list.

While the term FRUC refers to motion vector derivation for Frame Rate Up-Conversion, the underlying techniques are intended for a decoder to derive one or more merge MV candidates without the need for explicitly transmitting motion information. Accordingly, the FRUC is also called decoder derived motion information in this disclosure. Since the template matching method is a pattern-based MV derivation technique, the template matching method of the FRUC is also referred as Pattern-based MV Derivation (PMVD) in this disclosure.

In the decoder side MV derivation method, a new temporal MVP called temporal derived MVP is derived by scanning all MVs in all reference pictures. To derive the LIST_0 temporal derived MVP, for each LIST_0 MV in the LIST_0 reference pictures, the MV is scaled to point to the current frame. The 4×4 block that pointed by this scaled MV in current frame is the target current block. The MV is further scaled to point to the reference picture that refIdx is equal 0 in LIST_0 for the target current block. The further scaled MV is stored in the LIST_0 MV field for the target current block. FIG. 5A and FIG. 5B illustrate examples for deriving the temporal derived MVPs for LIST_0 and LIST_1 respectively. In FIG. 5A and FIG. 5B, each small square block corresponds to a 4×4 block. The temporal derived MVPs process scans all the MVs in all 4×4 blocks in all reference pictures to generate the temporal derived LIST_0 and LIST_1 MVPs of current frame. For example, in FIG. 5A, blocks 510, blocks 512 and blocks 514 correspond to 4×4 blocks of the current picture (Cur. pic), LIST_0 reference picture with index equal to 0 (i.e., refidx=0) and LIST_0 reference picture with index equal to 1 (i.e., refidx=1) respectively. Motion vectors 520 and 530 for two blocks in LIST_0 reference picture with index equal to 1 are known. Then, temporal derived MVP 522 and 532 can be derived by scaling motion vectors 520 and 530 respectively. The scaled MVP is then assigned it to a corresponding block. Similarly, in FIG. 5B, blocks 540, blocks 542 and blocks 544 correspond to 4×4 blocks of the current picture (Cur. pic), LIST_1 reference picture with index equal to 0 (i.e., refidx=0) and LIST_1 reference picture with index equal to 1 (i.e., refidx=1) respectively. Motion vectors 550 and 560 for two blocks in LIST_1 reference picture with index equal to 1 are known. Then, temporal derived MVP 552 and 562 can be derived by scaling motion vectors 550 and 560 respectively.

For the bilateral matching merge mode and template matching merge mode, two-stage matching is applied. The first stage is PU-level matching, and the second stage is the sub-PU-level matching. In the PU-level matching, multiple initial MVs in LIST_0 and LIST_1 are selected respectively. These MVs includes the MVs from merge candidates (i.e., the conventional merge candidates such as these specified in the HEVC standard) and MVs from temporal derived MVPs. Two different staring MV sets are generated for two lists. For each MV in one list, a MV pair is generated by composing of this MV and the mirrored MV that is derived by scaling the MV to the other list. For each MV pair, two reference blocks are compensated by using this MV pair. The sum of absolutely differences (SAD) of these two blocks is calculated. The MV pair with the smallest SAD is selected as the best MV pair.

After a best MV is derived for a PU, the diamond search is performed to refine the MV pair. The refinement precision is ⅛-pel. The refinement search range is restricted within +1 pixel. The final MV pair is the PU-level derived MV pair. The diamond search is a fast block matching motion estimation algorithm that is well known in the field of video coding. Therefore, the details of diamond search algorithm are not repeated here.

For the second-stage sub-PU-level searching, the current PU is divided into sub-PUs. The depth (e.g. 3) of sub-PU is signalled in sequence parameter set (SPS). Minimum sub-PU size is 4×4 block. For each sub-PU, multiple starting MVs in LIST_0 and LIST_1 are selected, which include the MV of PU-level derived MV, zero MV, HEVC collocated TMVP of current sub-PU and bottom-right block, temporal derived MVP of current sub-PU, and MVs of left and above PU/sub-PU. By using the similar mechanism as the PU-level searching, the best MV pair for the sub-PU is determined. The diamond search is performed to refine the MV pair. The motion compensation for this sub-PU is performed to generate the predictor for this sub-PU.

For the template matching merge mode, the reconstructed pixels of above 4 rows and left 4 columns are used to form a template. The template matching is performed to find the best matched template with its corresponding MV. Two-stage matching is also applied for template matching. In the PU-level matching, multiple starting MVs in LIST_0 and LIST_1 are selected respectively. These MVs include the MVs from merge candidates (i.e., the conventional merge candidates such as these specified in the HEVC standard) and MVs from temporal derived MVPs. Two different staring MV sets are generated for two lists. For each MV in one list, the SAD cost of the template with the MV is calculated. The MV with the smallest cost is the best MV. The diamond search is then performed to refine the MV. The refinement precision is ⅛-pel. The refinement search range is restricted within +1 pixel. The final MV is the PU-level derived MV. The MVs in LIST_0 and LIST_1 are generated independently.

For the second-stage sub-PU-level searching, the current PU is divided into sub-PUs. The depth (e.g. 3) of sub-PU is signalled in SPS. Minimum sub-PU size is 4×4 block. For each sub-PU at left or top PU boundaries, multiple starting MVs in LIST_0 and LIST_1 are selected, which include the MV of PU-level derived MV, zero MV, HEVC collocated TMVP of current sub-PU and bottom-right block, temporal derived MVP of current sub-PU, and MVs of left and above PU/sub-PU. By using the similar mechanism as the PU-level searching, the best MV pair for the sub-PU is determined. The diamond search is performed to refine the MV pair. The motion compensation for this sub-PU is performed to generate the predictor for this sub-PU. For the PUs that are not at left or top PU boundaries, the second-stage sub-PU-level searching is not applied, and the corresponding MVs are set equal to the MVs in the first stage.

In this decoder MV derivation method, the template matching is also used to generate a MVP for Inter mode coding. When a reference picture is selected, the template matching is performed to find a best template on the selected reference picture. Its corresponding MV is the derived MVP. This MVP is inserted into the first position in AMVP. AMVP represents advanced MV prediction, where a current MV is coded predictively using a candidate list. The MV difference between the current MV and a selected MV candidate in the candidate list is coded.

Neighbouring-Derived Prediction Offset (NPO)

Neighbouring-derived Prediction Offset (NPO) is a new coding tool developed recently to improve the motion compensated predictors adding a prediction offset. With this offset, the different lighting conditions between frames can be considered. The offset is derived using neighbouring reconstructed pixels (NRP) and extended motion compensated predictors (EMCP).

FIG. 6 shows one exemplary implementation to derive the offset. The patterns chosen for NRP and EMCP are N-columns (612 and 622) on the left and M rows (614 and 624) on the top of the current PU 610 and the reference block 620 respectively, where N and M are predetermined values. While rectangular NRP and EMCP are illustrated in the example, the patterns can be of any size and shape and can be decided according to any encoding parameters, such as PU or CU sizes, as long as both NRP an EMCP use the same size and shape. The offset is calculated as the average pixel value of NRP minus the average pixel value of EMCP. This derived offset will be applied to the whole PU as well as the motion compensated predictors.

FIG. 7 shows another exemplary implementation to derive the offset. First, for each of neighbouring positions (i.e., left pixels 710 and above pixels 720 of the left boundary and top boundary of the current block 730), the individual offset is calculated as the corresponding pixel in NRP minus the pixel in EMCP. Exemplary offset values of 6, 4, 2, and −2 for the above neighbouring positions 720 and 6, 6, 6, and 6 for the left neighbouring positions 710 are shown in FIG. 7.

After the offset values for the neighbouring positions are obtained, the derived offset for each position in the current PU 730 will be derived as the average of the offsets from the left and above positions as shown in illustration 740. For example, the first position at the top left corner 731 of the current PU, offset of 6 will be generated by averaging the offset from left and above (i.e., (6+6)/2=6). For the next position 732 on the right, the offset is derived as 5 (i.e., (6+4)/2=5). The offset values for the remaining positions can be processed and generated accordingly in a raster scan order. Since the neighbouring pixels are more highly correlated to the boundary pixels, so are the offsets. The offset can be adapted to the pixel positions according to NPO. The derived offsets will be adapted over the PU and applied to each PU position individually along with the motion compensated predictors.

Local Illumination Compensation (LIC)

Local Illumination Compensation (LIC) is a method to perform Inter prediction using neighbour samples of the current block and a reference block. It is based on a linear model using a scaling factor a and an offset b. The method derives the scaling factor a and the offset b by referring to the neighbour samples of the current block and the reference block. Moreover, the LIC process can be enabled or disabled adaptively for each CU.

More details regarding LIC can be found in JVET-C1001 ((Xu Chen, et al., "Algorithm Description of Joint Exploration Test Model 3", Joint Video Exploration Team (JVET) of ITU-T SG 16 WP 3 and ISO/IEC JTC 1/SC 29/WG 11, 3rd Meeting: Geneva, CH, 26 May-1 Jun. 2016, Document: JVET-C1001).

Advanced Motion Vector Resolution (AMVR)

To improve the coding gain, the Advanced Motion Vector Resolution (AMVR) has also been introduced recently. The AMVR can adaptively switch the resolution of Motion Vector Difference (MVD). The Motion Vector Difference (MVD) between a current MV and the MV predictor of a PU) can be coded with either quarter-pel resolution or integer-pel resolution. The switching is controlled at coding unit (CU) level and an integer MVD resolution flag is (conditionally) signalled.

More details regarding AMVR can be found in JVET-C1001 ((Xu Chen, et al., "Algorithm Description of Joint Exploration Test Model 3", Joint Video Exploration Team (JVET) of ITU-T SG 16 WP 3 and ISO/IEC JTC 1/SC 29/WG 11, 3rd Meeting: Geneva, CH, 26 May-1 Jun. 2016, Document: JVET-C1001).

In the following disclosure, various techniques to improve the coding efficiency or to reduce complexity related to bilateral template MV refinement are described.

SUMMARY

Method and apparatus of using Bilateral Template MV Refinement (i.e., Decoder-side MV refinement (DMVR)) are disclosed to improve coding efficiency or reducing complexity. According to one method, if a size associated with the current block is greater than a threshold, then Bilateral Template MV Refinement is applied to the current block. Otherwise, the Bilateral Template MV Refinement is not applied to the current block. The size associated with the current block may correspond to a block size of the current block. The size associated with the current block may also correspond to a block width or block height of the current block.

In another method, a decision regarding whether to apply Bilateral Template MV Refinement to the current block is derived based on the reference block 0 and the reference block 1. In one embodiment, the decision is derived based on a measurement of differences between the reference block 0 and the reference block 1. For example, the measurement of differences between the reference block 0 and the reference block 1 can be calculated as a sum of absolution differences (SAD) between the reference block 0 and the reference block 1. In this case, if the measurement of differences is smaller than a threshold value, the decision indicates applying Bilateral Template MV Refinement to the current block. The threshold value is allowed to change from one PU to another PU, from one slice to another slice, or from one picture to another picture. The threshold value may correspond to a pre-defined fixed value. In another embodiment, the threshold value is determined according to bit-depth of the current picture. In yet another embodiment, the current block corresponds to one prediction unit (PU) and the threshold value is determined according to the PU size. The threshold value can be signalled in a sequence level, picture level, slice level, or PU level.

According to yet another method, Bilateral Template MV Refinement is applied at a sub-block level. The current block, the reference block 0, the reference block 1 and the current template are all partitioned into sub-blocks using a same sub-block partition. A refined sub-block motion vector 0 (sub-MV0') pointing to a refined reference sub-block 0 in the list0 reference picture and a refined sub-block motion vector 1 (sub-MV1') pointing to a refined reference sub-block 1 in the list1 reference picture. The sub-MV0' yields a smallest first template cost between the refined reference sub-block 0 and one corresponding sub-template, and the sub-MV1' yields a smallest second template cost between the refined reference sub-block 1 and one corresponding sub-template in the list1 reference picture. A final sub-block predictor is generated for the current sub-block by combining the refined reference sub-block 0 and the refined reference sub-block 1. The current sub-block is encoded or decoded predictively using the final sub-block predictor. A flag can be signalled in a sequence level, picture level, slice level, or PU level to indicate whether sub-block bilateral template MV refinement is enabled. The same sub-block partition divides each block into sub-blocks having a sub-block width and a sub-block height, and information associated with the sub-block width the sub-block height is signalled in a sequence level, picture level, slice level, or PU level.

According to still yet another method, the motion vectors corresponding to an AMVP (advanced MV prediction) candidate in the bi-prediction mode are used as initial motion vectors for the Bilateral Template MV refinement process. An AMVP candidate is determined as an MV0 (motion vector 0) and an MV1 (motion vector 1) for the current block, wherein the MV0 points to a reference block 0 in a list0 reference picture and the MV1 points to a reference block 1 in a list1 reference picture. The MV0 and MV1 are refined into a refined motion vector 0 (MV0') and a refined motion vector 1 (MV1') according to Bilateral Template MV Refinement process. The current block is then processed using information related to the refined MV0' and the refined MV1'. For example, a final predictor for the current block can be generated by combining the refined reference block 0 pointed by the MV0' and the refined reference block 1 pointed by the MV1'. The current block is encoded or decoded predictively using the final predictor. A flag can be signalled in a sequence level, picture level, slice level, or PU level to indicate whether Bilateral Template MV Refinement process is applied to the MVs from an AMVP candidate to refine the MVs. Whether to use the Bilateral Template MV Refinement process can be determined according to the MVD (motion vector differences) resolution. For example, if the MVD resolution corresponds to fractional-pel resolution, the Bilateral Template MV Refinement process is disabled.

According to still yet another method, a motion vector pointing to a first reference block in a first reference picture of a first list is refined using a second reference block in a second reference picture in a second reference list as a template. Similarly, a motion vector pointing to the second reference block in a second reference picture of a second list is refined using the first reference block or the refined first reference block in the first reference picture in the first reference list as a template.

According to still yet another method, Bilateral Template MV Refinement is applied to the current block using at least two MV pairs to derive an initial MV pair or a final MV pair. If at least two MV pairs are used to derive the initial MV pair, an initial MV0 (motion vector 0) pointing to a reference block 0 in a list0 reference picture and an initial MV1 (motion vector 1) pointing to a reference block 1 in a list1 reference picture are determined from said at least two MV pairs, where one MV pair from said at least two MV pairs that achieves a lowest cost is selected as the initial MV0 and the initial MV1. If at least two MV pairs are used to derive the final MV pair, refined motion vectors pointing to refined reference blocks are derived. The reference blocks and the refined reference blocks are combined to form a final predictor for the current block.

BRIEF DESCRIPTION OF THE DRAWINGS

FIG. 12 illustrates an example of detailed operations of Implicit Switch-Based Bilateral Template MV Refinement.

FIG. 13 illustrates exemplary pseudo codes to implement the Implicit Switch-Based Bilateral Template MV Refinement process.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

As mentioned previously, Bilateral Template MV Refinement technique has been developed recently. In the present invention techniques are disclosed to improve coding performance, to reduce system bandwidth, to reduce computational complexity or a combination of them for Bilateral Template MV Refinement.

Iterative Bilateral Template MV Refinement with a Fixed Number of Iterations

According to this method, an Iterative Bilateral Template MV Refinement technique is disclosed to improve the coding efficiency. The main idea of Iterative Bilateral Template MV Refinement is to further refine the motion information so as to improve the coding performance. In one embodiment, the Bilateral Template MV Refinement can be iterated for N times. For iteration i, it uses the refined MVs of iteration (i−1) as the initial MVs of iteration i.

The details of this method are described as follows. The process can be implemented in 5 steps. In Step 1, for the current block, the initial MV_L0 (i.e., List 0 MV) and initial MV_L1 (i.e., List 1 MV) are determined, where MV_L0 and MV_L1 are the current MVs of current PU. For example, the initial MV_L0 (List 0 MV) and initial MV_L1 (List 1 MV) are from the current Merge candidate. However, the choice of initial MVs according to the present invention is not limited to this example. The L0 reference block pointed by MV_L0 and L1 reference block pointed by MV_L1 of the current block can be located accordingly. In Step 2, the Bilateral Template MV Refinement process is performed based on the initial MVs. The Bilateral Template MV Refinement process will generate the refined MVs, referred as refine_MV_L0 and refine_MV_L1. In Step 3, the newly refined MVs are used as initial MVs for the next iteration by setting MV_L0=refine_MV_L0 and MV_L1=refine_MV_L1. In Step 4, the new L0 reference block and L1 reference block are located according to the new MV_L0 and new MV_L1. In Step 5, if the current number of iteration (denoted as i) is N, where N the total iteration number, the Iterative Bilateral Template MV Refinement process. Otherwise, (i.e., i<N), the index i is incremented by setting i=i+1) and the process goes to Step 2 for the next iteration.

In another embodiment, the number of iterations is adjustable. For example, a flag can be signalled to turn on or off for the Iterative Bilateral Template MV Refinement method. The signalling of the minimum size of units can be separately coded in sequence level, picture level, slice level, or PU level. The total number of iterations for the Iterative Bilateral Template MV Refinement method can also be signalled.

Figure 8:
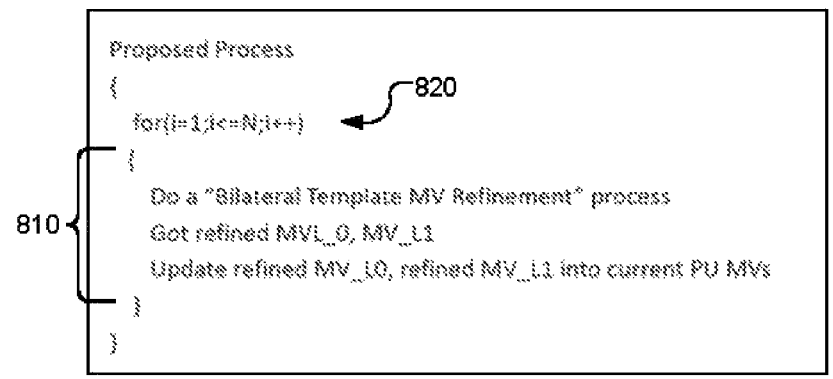
FIG. 8 illustrates an example of pseudo codes to implement the Iterative Bilateral Template MV Refinement process.

An example of pseudo codes to implement the Iterative Bilateral Template MV Refinement process is shown in FIG. 8. In FIG. 8, a round of Bilateral Template MV Refinement process is performed within the pair of braces 810. The statement 820 (i.e., "for (i=1; i<=N; i++") will cause the Bilateral Template MV Refinement process to be executed N times.

Iterative Bilateral Template MV Refinement with a Termination Criterion

Figure 9:
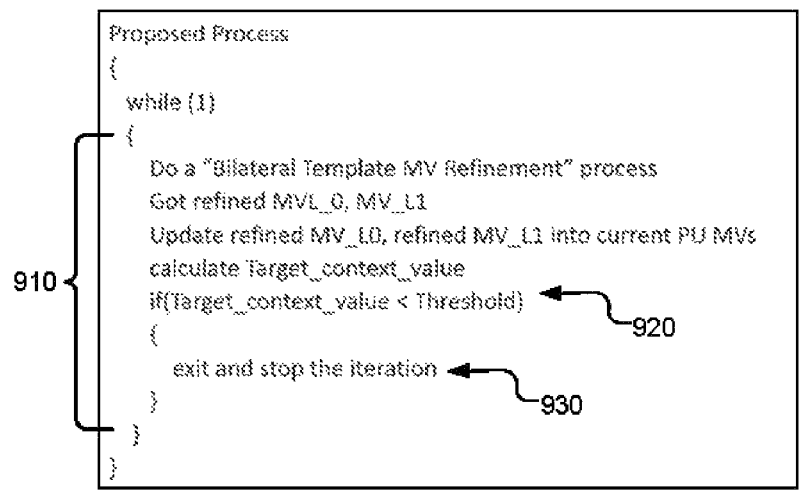
FIG. 9 illustrates an example of pseudo codes for implementing the Iterative Bilateral Template MV Refinement with a Termination Criterion.

In order to improve the coding efficiency and the computational efficiency, a method to use an implicit number of iterations for the Iterative Bilateral Template MV Refinement is disclosed. In the previous method, the number of iterations is fixed or signalled in the bit stream. According to the current method, a method to determine the number of iterations implicitly is disclosed. The implicit process can be an adaptive and content aware process. The idea behind this method is that, during each iteration for the Iterative Bilateral Template MV Refinement process, the "refinement difference" (e.g., MV or pixel value) is calculated. The "refinement difference" can be defined as the difference between original value (ex, MV or pixel value) and refined value. If the refinement difference (e.g. MV refinement difference or pixel value refinement difference) is less than a threshold, the iteration process will be terminated. To describe this method in details, a variable, Target context_value is defined as the value of "refinement difference", and a variable. Threshold is defined as the threshold for terminating the iteration. An example of pseudo codes for implementing this method is shown in FIG. 9. In FIG. 9, a round of Bilateral Template MV Refinement process is performed within the pair of braces 910. The statement 920 (i.e., "if(Target_context_value<Threshold)") corresponds to testing a termination condition. It the test condition is asserted (Target_context_value<Threshold), it triggers the processing loop to exit as indicated by statement 930.

Some embodiments for this method are shown below. In embodiment 1, the iteration will be terminated if motion vector difference after refinement is less than a threshold. In embodiment 2, the iteration will be terminated if pixel difference between current reference block and refined reference block is less than some threshold. In embodiment 3, the iteration will be terminated if some combination of motion vector difference and pixel difference is less than a threshold.

Embodiment 1

The main concept of embodiment 1 is that, the iteration will be terminated if motion vector difference after refinement is less than a threshold. An example of the detail algorithm can be shown in FIG. 9 with Target_context_value=L0_MV_difference+L1_MV_difference. For example, the L0_MV_difference can be the difference between original L0 MV and refined L0 MV. Similarly, L1 MV difference can be calculated. The L0 MV difference and L1 MV difference can be calculated according to the following equation:

$$L0\_MV\_difference = abs(\text{"original } L0MV\ x\ \text{part"} - \text{"Refined } L0MV\ x\ \text{part"}) + abs(\text{"original } L0MV\ y\ \text{part"} - \text{"Refined } L0MV\ y\ \text{part"})$$

$$L1\_MV\_difference = abs(\text{"original } L1MV\ x\ \text{part"} - \text{"Refined } L1MV\ x\ \text{part"}) + abs(\text{"original } L1MV\ y\ \text{part"} - \text{"Refined } L1MV\ y\ \text{part"})$$

In the above equations, abs( ) is the absolute value. "x part" is the horizontal part of an MV. "y part" is the vertical part of an MV.

Embodiment 2

The main concept behind embodiment 2 is that, the iteration will be terminated if pixel difference between current reference block and the refined reference block is less than some threshold. The detail algorithm can be shown in FIG. 9 with Target_context_value=L0_block_difference+L1_block_difference. For example, the L0_block_difference can be calculated as the difference between the original L0 reference block and the L0 refined block. Similarly, L1_block_difference can be calculated. The L0_block_difference and L1_block_difference can be calculated according to the following equation:

$$L0\_block\_difference = \text{SAD between } L0 \text{ reference block and } L0 \text{ Refined Block}$$

$$L0\_block\_difference = \text{SAD between } L0 \text{ reference block and } L0 \text{ Refined Block}$$

In the above equations, SAD corresponds to Sum of Absolute Difference, and the definition of L0 reference block and L0 Refined Block is shown in FIG. 9.

Embodiment 3

The main concept behind embodiment 3 is that the iteration will be terminated if some combination of motion vector difference and pixel difference is less than a threshold. An example of a detail algorithm for implementing the embodiment can be shown in FIG. 9 with Target_context_value=a*(L0_MV difference+L1_MV_difference)+b*(L0 block_difference+L1_block_difference), where a, b are weighting factors.

Sub-PU Based Bilateral Template MV Refinement

Figures 10, 11:
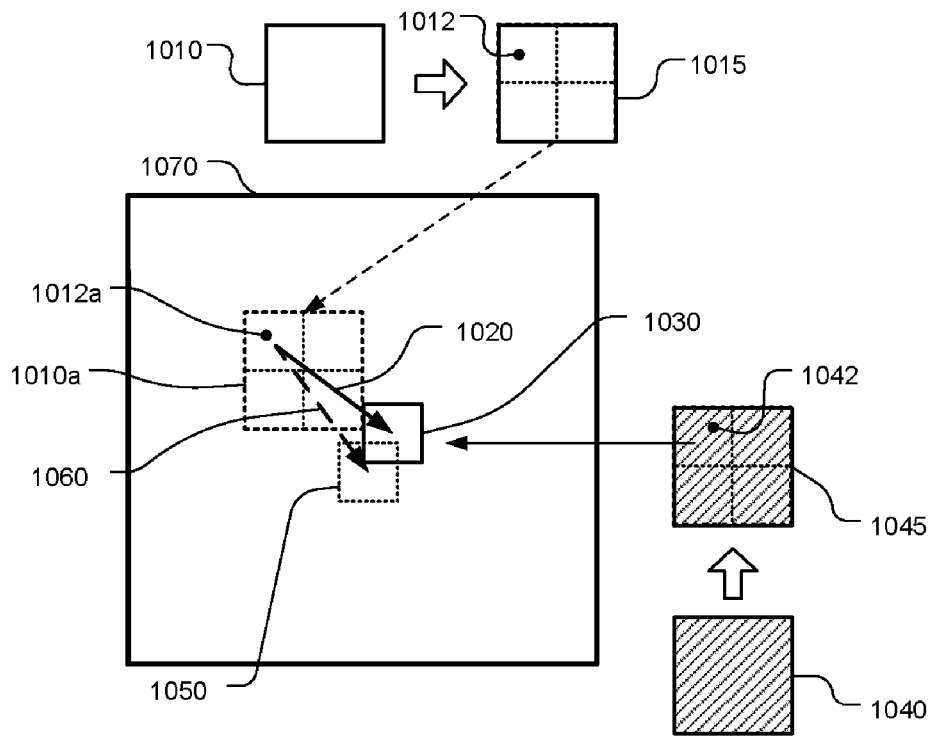
FIG. 10 illustrates an example of detailed operations of Sub-PU Based Bilateral Template MV Refinement.
FIG. 11 illustrates exemplary pseudo codes to implement the sub-PU Bilateral Template MV Refinement process.

In order to improve the coding efficiency, the Sub-PU Based Bilateral Template MV Refinement is disclosed. The main idea behind this method is to split a PU into Sub-PUs and then perform the Bilateral Template MV Refinement in the sub-PU level. An example of detailed operations of this method is shown in FIG. 10, where only the operations associated with the L0 part are shown. The operations associated with the L1 part can be derived similarly. The exemplary process in FIG. 10 comprises 4 steps. In FIG. 10, block 1010 is a current block. Initial motion vectors MV0 1020 and MV1 (not shown) for current block 1010 are determined, where MV0 points to an L0 reference block in L0 reference picture 1070 and MV1 points to an L1 reference block (not shown) in L1 reference picture. In Step 1, the L0 reference block and L1 reference block and combined to generate a bi-lateral template 1040. In Step 2, L0 reference block and L1 reference block are partitioned into sub-PUs. Also, the bi-lateral template 1040 is partitioned into sub-PUs. The current PU (size MxN) can be partitioned into (M/S)*(N/T) sub-PUs, each sub-PU is size SxT, where M is divisible by S and N is divisible by T. In FIG. 10, the example is shown for each block being partitioned into 2×2 sub-blocks. The current block 1010 is partitioned into sub-blocks 1015. The upper left sub-block 1012 of the current block and the upper left sub-block 1042 of the template are indicated. The corresponding locations of current block 1010 and sub-block 1012 in the L0 reference picture are indicated by the dash-lined block 1010a and sub-block 1012a. Also, the upper-left reference sub-block 1030 of the L0 reference block is indicated. In Step 3, for sub-PU j (j=1~(M/S)*(N/T)), Sub-PU level Bilateral Template MV Refinement is performed where the Bilateral Template MV Refinement process is perform at the sub-PU level. In FIG. 10, the Template MV Refinement process is shown for the sub-PU 1012 at upper-left corner of the current PU. The bi-lateral template 1040 (PU) is partitioned into sub-PUs 1045, where the upper-left corner sub-PU 1042 (shown in think-line box) of the bi-lateral template 1045 (PU) is used to generate a refined sub-PU reference block 1050. The refined L0 MV 1060 for the current sub-PU 1012 can be determined from locations of the current sub-PU 1012a and the refined sub-PU 1050. The refined L1 MV for the current sub-PU in the L1 reference picture can be derived similarly. In Step 4 the Refined Sub-PU L0 MVs and Refined Sub-PU L1 MVs are used as the MVs for a later stage process (e.g. motion compensation or BIO (Bidirectional Optical flow). The new refined Sub-PU L0 MVs and Refined Sub-PU L1 MV can be used as the new predictors for later stage (for example, motion compensation or BIO (Bidirectional Optical flow).

In Step 3 of the above process, the sub-process needs a sub-PU bi-lateral template as the input. Let's assuming that it is now processing sub-PU j. Then, it uses the sub-PU bi-lateral template to perform Motion Estimation search around "L0 Reference Sub Block of the sub-PU j" in L0 reference picture with a search range of P2×Q2. The refined MV of L0 is derived as the MV with minimum ME cost (e.g. minimum sum of absolute differences, SAD). Then, the sub-PU bi-lateral template is used to perform Motion Estimation search around "L1 Reference Sub Block of the sub-PU j" in L1 reference picture with a search range of P2×Q2. The refined MV of L1 is derived as the MV with minimum ME cost (e.g. minimum sum of absolute differences, SAD). Finally, the output of this sub-PU Bilateral Template MV Refinement process is the refined MV of L0 and the refined MV of L1 for the sub-PU j.

Exemplary pseudo codes to implement the sub-PU Bilateral Template MV Refinement process are shown in FIG. 11, where the Bilateral Template MV Refinement process is perform for each sub-PU as indicated by the codes within the brace pair 1110.

Furthermore, a flag to turn on or off the sub-PU Bilateral Template MV Refinement process can be signalled according to one embodiment of the present invention. For example, a flag (e.g. "sub_pu_mv_refine_en") may be signalled to indicate whether "Sub-PU Based Bilateral Template MV Refinement" is enabled (value 1: enabled, value 0: disabled and back to original Bilateral Template MV Refinement mode). When not present, the value of sub_pu_mv_refine_en is inferred to be 0. The flag, sub_pumvrefine_en, can also be signalled separately in a sequence level, picture level, slice level, or PU level. Moreover. Furthermore, the sub-PU size is adjustable according to one embodiment of the present invention. It is proposed to signal one or more variables (e.g. "sub_pu_mvy_refine_width" and "sub_pu_mv_refine_height") to indicate the sub-PU width and height for the proposed method. Said one or more variables can also be signalled separately in sequence level, picture level, slice level, or PU level.

CU/PU Size Dependent Bilateral Template MV Refinement

The bilateral template MV refinement requires additional reference pixels to perform the MV refinement, which will increase the worst case bandwidth. In order to reduce the worst case bandwidth, it is proposed to disable the bilateral template MV refinement when the CU/PU area is smaller than (or equal to) a threshold. For example, if the CU/PU size is smaller than and equal to 64, the bilateral template MV refinement is disabled. In another embodiment, the bilateral template MV refinement is disabled when the CU/PU width is smaller than (or equal to) a threshold M and/or the CU/PU height is smaller than (or equal to) a threshold N. For example, if the CU/PU width is smaller than and equal to 8 and the height is smaller than and equal to 8, the bilateral template MV refinement is disabled.

Bilateral Template MV Refinement for Colour Video

In order to improve the coding efficiency, the Bilateral Template MV Refinement for colour video according to this method uses original (i.e., before refinement) MVs of the luminance component for MVs for the chrominance components instead of using refined MV of the luminance component. When the process of the Bilateral Template MV Refinement is done, the Y and CbCr MVs are derived as:

New $Y\,L0\,MV$=refined $Y\,L0\,MV$

New $Y\,L1\,MV$=refined $Y\,L1\,MV$

New CbCr $L0\,MV$=original $Y\,L0\,MV/C\_scal\_CbCr$

New CbCr $L1\,MV$=original $Y\,L1\,MV/C\_scal\_CbCr$

In the above equations, C_scal_CbCr is the chrominance scaling factor. Since Cr and Cb always use the same sub-sampling format, a same chrominance scaling actor is used for both chrominance components.

Bilateral Template MV Refinement for Colour Video— Separate MV Refinement for Chroma Components In another method, instead of using s refined MV of the luminance (i.e., Y) component, the Cb and Cr components derive their own MV refinement. Accordingly, a chroma-based Bilateral Template MV Refinement process is disclosed that starts with initial MV:

CbCr original $L0\,MV=Y$ original $L0\,MV/C\_scal\_CbCr$

CbCr original $L1\,MV=Y$ original $L1\,MV/C\_scal\_CbCr$

Figure 1:
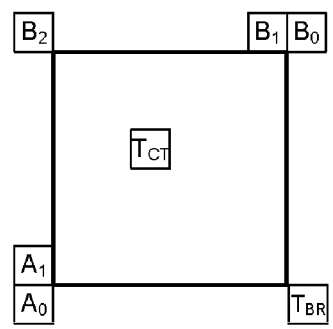
FIG. 1 illustrates the spatial and temporal neighbouring blocks used to derive Merge candidates according to HEVC (High Efficiency Video Coding).
Figure 2:
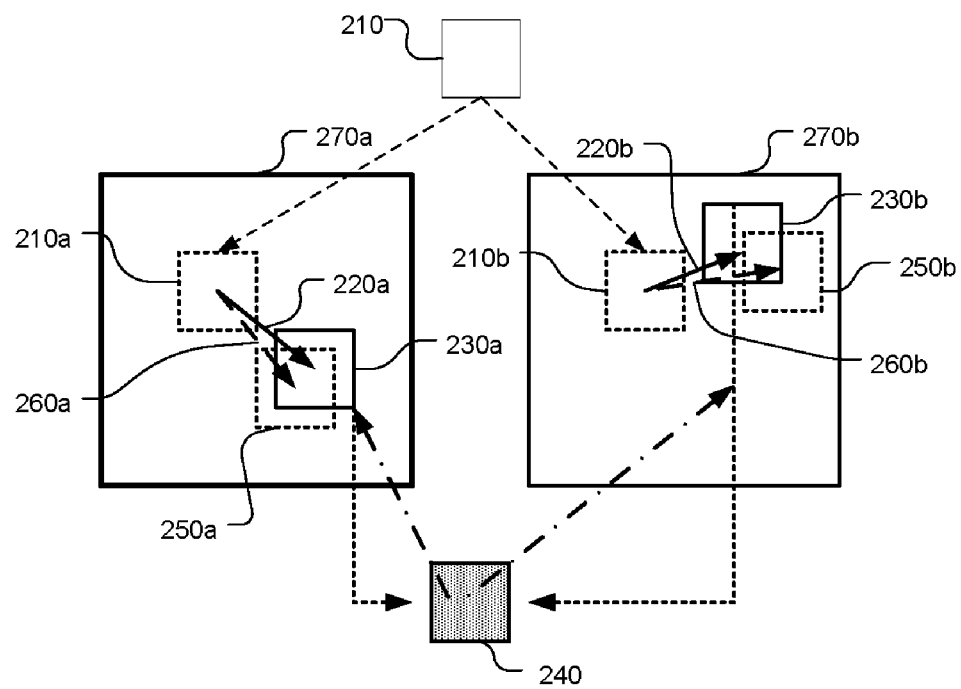
FIG. 2 illustrates an example of Bilateral Template MV Refinement (i.e., Decoder-Side Motion Vector Refinement (DMVR)) process.
Figure 3:
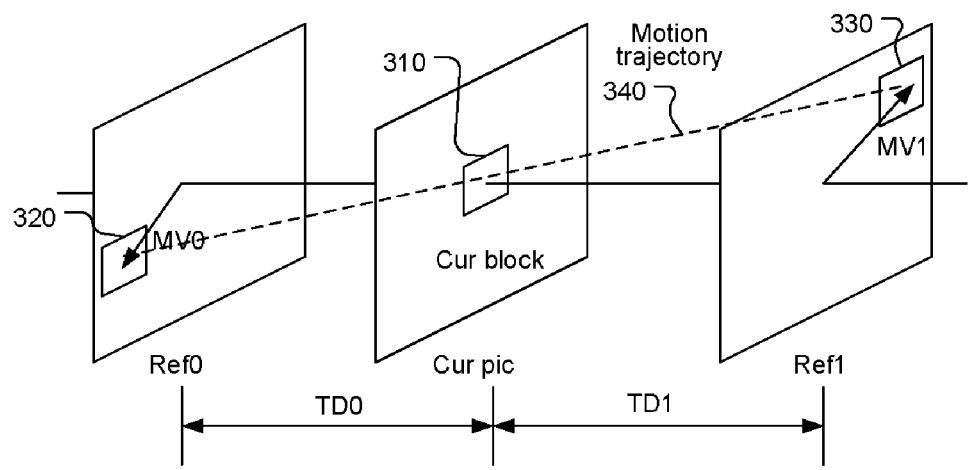
FIG. 3 illustrates an example of FRUC bilateral matching mode, where the motion information for a current block is derived based on two reference pictures.
Figure 4:
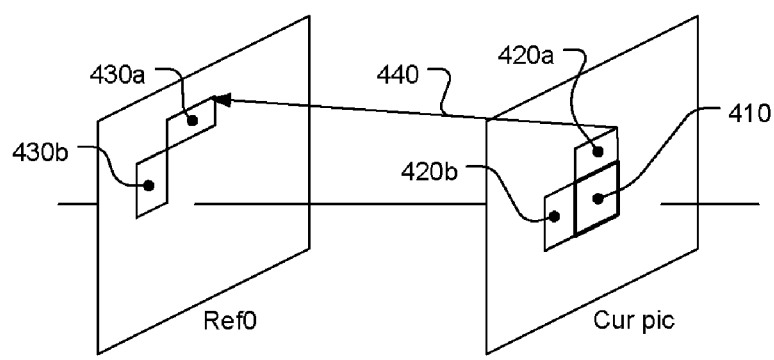
FIG. 4 illustrates an example of template matching FRUC (Frame Rate Up Conversion) mode.
Figure 5A:
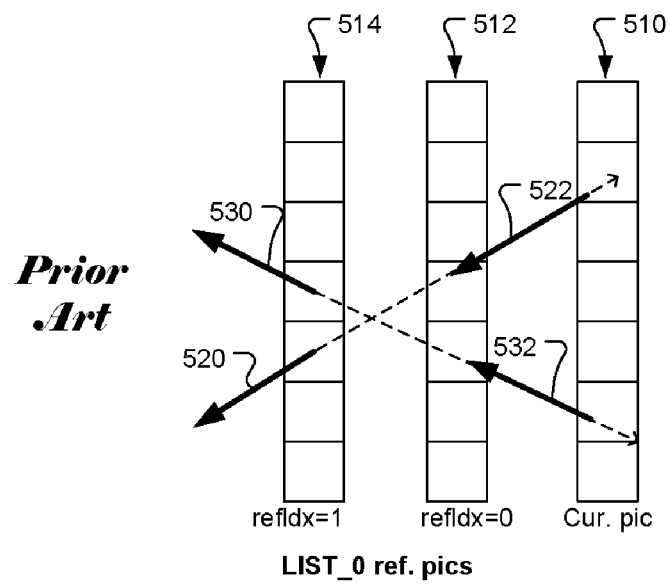
FIG. 5A and FIG. 5B illustrate examples for deriving the temporal derived MVPs for List_0 and List_1 respectively.
Figure 5B:
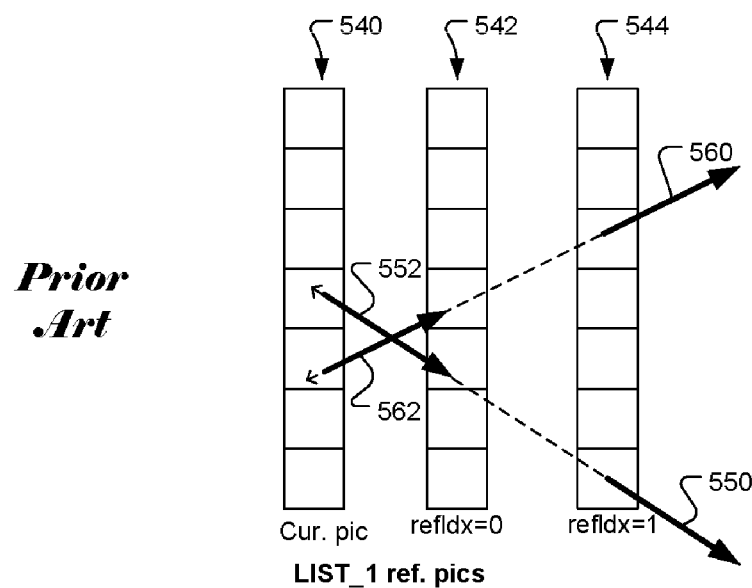
Figure 6:
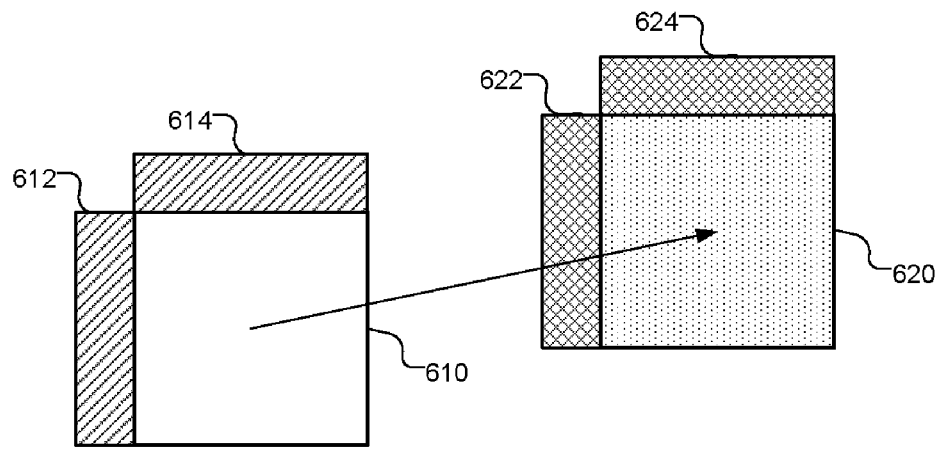
FIG. 6 shows one exemplary implementation to derive the offset for Neighbouring-derived Prediction Offset (NPO).
Figure 7:
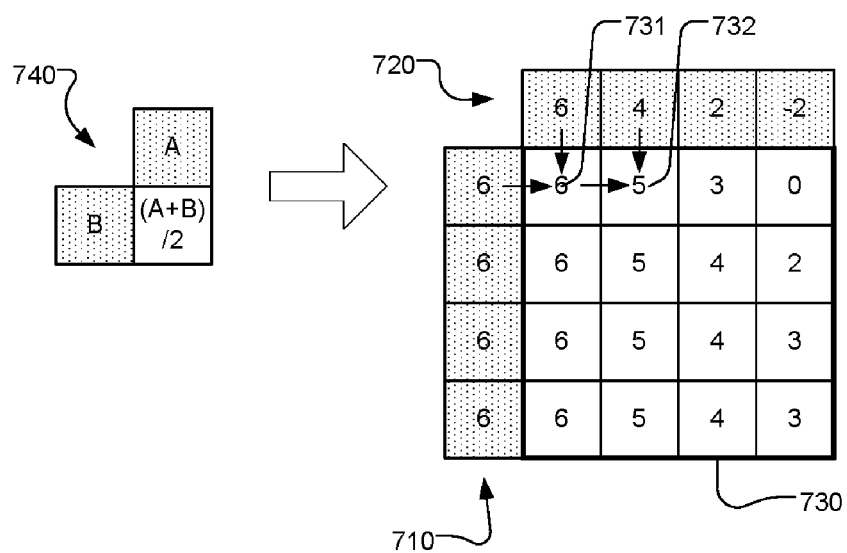
FIG. 7 shows another exemplary implementation to derive the offset, where an above pixel and a left pixel are averaged to form a predictor for a current pixel.

The detailed chroma-based process flow is the same as the luma-based process flow, which is shown in FIG. 2. During Bilateral Template MV Refinement in the chroma domain, all the L0/L1 reference picture (270a/270b), original L0/L1 MV (220a/220b), L0/L1 reference block (210a/210b), bi-lateral template (240) are derived for the chroma components in the chroma domain. In other words, L0 reference picture is chroma L0 reference picture, the original L0 MV=Y original L0 MV/C_scal_CbCr, the L0 reference block is the chroma reference block pointed by chroma original L0 MV, and the bi-lateral template are generated by chroma L0 reference block and chroma L1 reference block. The above derivation for the L1 part can be performed similarly. Finally, after the processing of the chroma MV refinement, chroma refined L0 MV and chroma refined L1 MV are derived. The chroma reference blocks pointed by the refined MV of L0 (250*a*) and refined MV of L1 (250*b*) are the final chroma reference blocks for later stage (e.g. motion compensation).

Implicit Switch-Based Bilateral Template MV Refinement

In order to improve the coding efficiency, Implicit Switch-Based Bilateral Template MV Refinement is disclosed. An example to implement this method is described as follows. In Step 1, the L0 reference block and L1 reference block are obtained as shown in FIG. 12, where the derivations are similar to that in FIG. 2. In Step 2, the difference, denoted as cur_diff 1210, between L0 reference block and L1 reference block are calculated. Various measurements can be used for the difference between L0 reference block and L1 reference block. For example, the SAD (Sum of Absolute Difference) can be used. In Step 3, a threshold is determined for the current PU. The threshold may change from PU to PU, from slice to slice, or from picture to picture. In Step 4, the cur_diff is compared with the threshold. If cur_diff is smaller than the threshold, the Bilateral Template MV Refinement is performed. In this case, the refined MVs are used as the final MVs for the PU. However, if cur_diff is greater than or equal to the threshold, the Bilateral Template MV Refinement is turned off for the PU. In this case, the original MVs are used as the final MVs for the PU. Exemplary pseudo codes to illustrate the switch-based method are shown in FIG. 13, where the "if (difference<threshold)" is checked in statement 1310 and "difference" corresponds to "cur_diff" mentioned above. If the condition is asserted (i.e., (difference<threshold)), steps corresponding to Bilateral Template MV Refinement process as indicated by bracket 1320 are performed. Otherwise, (i.e., (difference≥threshold)), steps corresponding to original MVs for the PU as indicated by bracket 1330 are performed.

In one embodiment, the threshold can be a constant and pre-defined in the video codec system. In another embodiment, threshold for the proposed implicit switch-based method can be changed from PU to PU, from slice to slice, from picture to picture.

In yet another embodiment, the threshold is dependent on the bit-depth of the underlying video data. For example, the underlying video data may have 8-bit, 10-bit or 12-bit depth and the threshold for the 8-bit depth data is threshold_8 bit, the threshold for 10-bit depth can be derived as threshold_10bit=threshold_8 bit*4, and the threshold for 12-bit depth can be derived as threshold_12 bit=threshold_8 bit*16. In yet another embodiment, the threshold depends on the PU size. For example, one threshold can be selected for each PU size. Accordingly, if there are K different PU sizes, there are K thresholds.

In still yet another embodiment, the threshold value is signalled in the video bit-stream for the implicit switch-based method. The threshold can be signalled in a sequence level, picture level, slice level, or PU level.

Bilateral Template MV Refinement for AMVP

Figure 14:
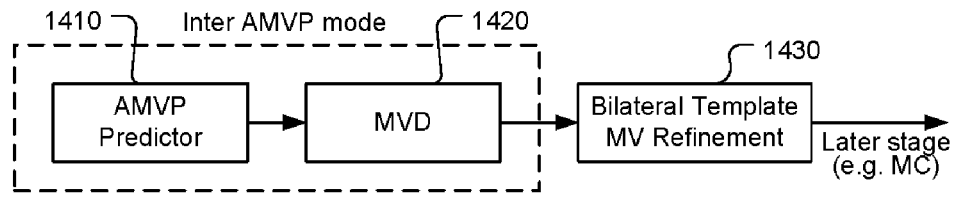
FIG. 14 illustrates a system that applies Bilateral Template MV Refinement for AMVP (advanced MV prediction).

In order to improve the coding efficiency, an AMVP-based Bilateral Template MV Refinement is disclosed. The basic idea is shown in FIG. 14. The Inter AMVP mode generates the AMVP predictor 1410 and MVD 1420. The AMVP predictor and MVD are combined to form the final MV for later stage (e.g. motion compensation, MC. According to this method, the Bilateral Template MV Refinement process 1430 is applied to the MVs of the Inter AMVP mode. The refined MVs will be used in a later stage (e.g. MC). According to this method, the original L0 MV and the original L1 MV in FIG. 2 become the MVs of Inter AMVP mode, while the original L0 MV and the original L1 MV in FIG. 2 for the conventional method correspond to the MVs of Merge/Skip modes.

In one embodiment, a flag can be signalled to turn on or off the AMVP-based Bilateral Template MV Refinement. For example, a flag (e.g. "amvp_refine_en") may be signalled to indicate whether this method is enabled (e.g., value 1: enabled, value 0: disabled). When not present, the value of amvp_refine_en is inferred to be 0. The flag, amvp_refine_en, can also be signalled in the sequence level, picture level, slice level, or PU level.

Moreover, in the AMVP-based Bilateral Template MV Refinement, the Bilateral Template MV Refinement can be selectively turned on or off depending on the MVD resolution. In AMVR (Advanced Motion Vector Resolution) mode, the MVD resolution may be integer or fractional depending on the AMVR flag. According to one embodiment, if the MVD resolution is fractional (e.g., quarter pel), the MVs is not processed by the Bilateral Template MV Refinement. If the MVD resolution is integer, the MVs from Inter AMVP is further processed by the Bilateral Template MV Refinement.

In another embodiment, a flag (e.g. "amvr_refine_en") may be signalled to indicate whether this method is enabled (e.g., value 1: enabled, value 0: disabled). When not present, the value of amvr_refine_en is inferred to be 1. The flag, amvr_refine_en, can also be signalled in the sequence level, picture level, slice level, or PU level.

Bilateral Template MV Refinement for LIC/NPO

In order to improve the coding efficiency, LIC/NPO-based Bilateral Template MV Refinement is disclosed. The basic idea behind this method is to modify the Bilateral Template MV Refinement flow according to the LIC/NPO algorithm. Two embodiments are disclosed including a Post-NPO (or Post-LIC) based method and a Pre-NPO (or Pre-LIC) based method.

Embodiment 1: Post-NPO (Post-LIC) Based Method

Figure 15:
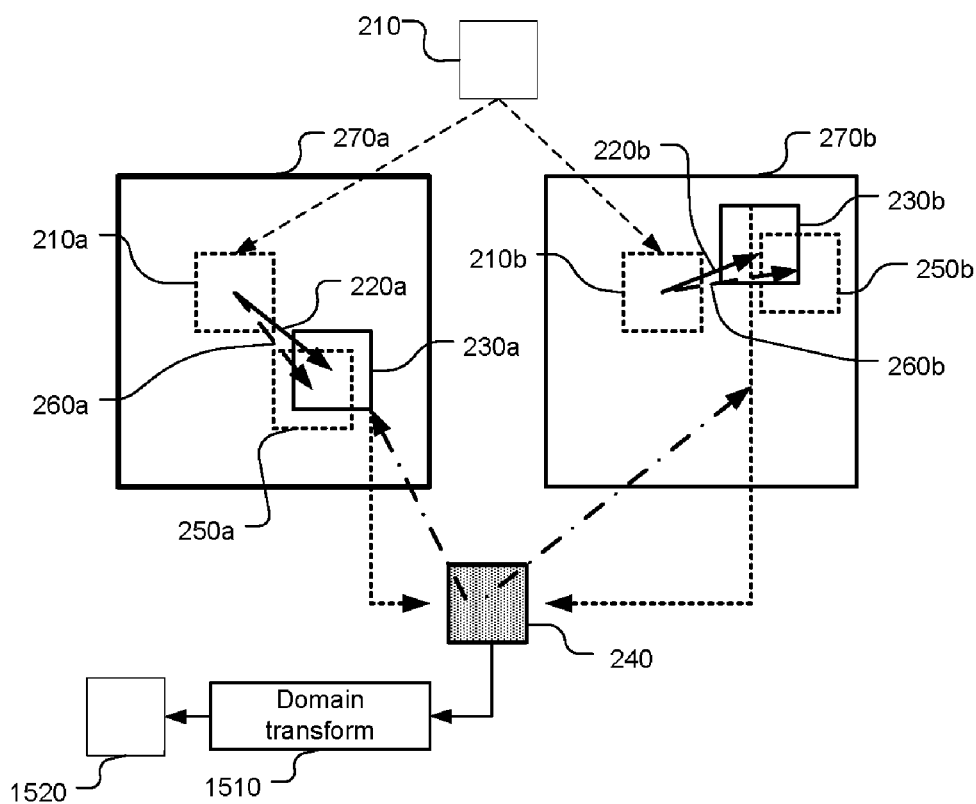
FIG. 15 illustrates exemplary pseudo codes to implement the Bilateral Template MV Refinement process for LIC or NPO.

FIG. 15 based on FIG. 2 can be used to illustrate this embodiment. Similar to the conventional Bilateral Template MV Refinement, the L0 reference block is generated in order to perform the NPO or LIC processing. The L0 reference block is stored in temp-buffer 0. Similarly, the L1 reference block is generated and stored in temp-buffer 1. The pixels from temp-buffer 0 and temp-buffer 1 are used to generate the bilateral template. Various techniques can be used to generate the bilateral template, such as averaging the corresponding pixels from temp-buffer 0 and temp-buffer 1 to form the bilateral template. A domain transform procedure 1510 for the bilateral template is needed for the NPO or LIC process. The transformed template 1520 is then used to derive the local ME and refine the MVs. The purpose of the domain transform (i.e., from NPO/LIC domain to the original pixels domain) is to transform the bilateral template (i.e., NPO/LIC processed domain) to the original reference pixels domain. The "NPO/LIC domain to original domain transform" is an inverse-LIC or inverse-NPO processing. For the case of NPO, the inverse NPO directly subtracts the NPO offsets of the L0 reference block from the template and stores the result in the buffer, template_sub_off0. The template_sub_off0 is then used to perform the local ME in the L0 reference picture and refine the original L0 MV to derive the refined L0 MV, as shown in FIG. 15. For L1, similar process can be performed to refine the original L1 MV to derive the refined L1 MV, as shown in FIG. 15.

Embodiment 2: Pre-NPO (Pre-LIC) Based Method

According to this embodiment, the conventional Bilateral Template MV Refinement can be performed and there are is no LIC/NPO process involved. The original L0 MV is refined to the refined L0 MV and the original L1 MV is refined to the refined L1 MV as shown in FIG. 2. Then, the NPO/LIC procedure is performed for the L0 refined block and L1 refined block, the NPO/LIC processed L0 block and NPO/LIC processed L1 block are then used by later stages, such as motion compensation.

Multiple MV-Pair Candidates

When a bi-prediction MV pair is signalled (e.g. an Merge index indicating a selected bi-predicted Merge candidate), a predefined MV refinement process is perform to refine the LIST_0 and LIST_1 MVs for better coding efficiency according to the conventional Bilateral Template MV Refinement disclosed in JVET-D0029. In order to further improve the coding performance, various modified MV refinement methods are disclosed as follow:

First, a Bi-prediction block (the Bi-predicted template) is generated by using the bi-prediction from the reference blocks of MV0 and MV1. Using the bi-prediction block as a new current block (i.e., a template) and perform the motion estimation to find a better matching block in reference picture 0 and reference picture 1 respectively, which is the same as. The refined MVs are referred as MV0' and MV1'. The refined MVs (MV0' and MV1') are then used to generate a final bi-predicted prediction block for the current block. According to this method, the initial MVs for MV refinement can be derived by evaluating multiple MV candidates (e.g. multiple Merge candidates) that correspond to the bi-prediction mode for the current block. The MV candidate with the lowest cost is the starting or initial MVs for the MV refinement.

In one embodiment, the final bi-predicted prediction block for the current block is generated by using the MVs of {MV0, MV1, MV0', MV1' }, where MV0 and MV1 correspond to initial MV pair and MV0' and MV1' correspond to refined MV pair.

In another embodiment, after refining the prediction block in LIST_0 (or LIST_1), the bi-prediction can be regenerated by using the refined LIST_0 (or LIST_1) predictor and the original LIST_1 (or LIST_0) predictor. The regenerated Bi-pred. is used to refine the LIST_1 (or LIST_0) predictor.

Modified Template

From the signalled MV pairs (e.g. MV0 and MV1), two motion estimation (ME) processes are performed to refine the MV0 and MV1. To refine the MV0, the predicted block in reference picture 1 based on MV1 is used as the new current block (i.e., a template). The MV0 is refined into MV0' by using the new current block. Also, the MV1 is refined into MV1' by using the predicted block in reference picture 0 based on MV0 as the new current block (i.e., a template). The initial search MVs are the MV0 and MV1 for these two ME processes. The final bi-predicted prediction block for the current block is generated by using the MV pair, {MV0', MV1'}.

In one embodiment, after refining the prediction block in LIST_0 (or LIST_1), the updated LIST_0 (or LIST_1) predictor is used to refine the LIST_1 (or LIST_0) predictor.

Explicit Decoder Side MV Refinement Mode

A syntax MV_refine_flag can be signalled to enable or disable the proposed MV refinement method. The flag can be signalled conditionally. For example, it only applied for the Merge mode or AMVP mode.

When the MV_refine_flag is true, a MV candidate list is derived. If the number of MV in the candidate list is larger than 1, an MV_refine_index is signalled to indicate the initial search point of the decoder side MV refinement.

The Merge candidate list generation process can be used for MV candidate list generation process. The valid neighbouring motion information and temporal collocated motion information can be put into the candidate list. If the motion information is not bi-prediction MVs or not the true bi-prediction MV (i.e., one reference picture before the current picture and the other reference picture after the current picture), the motion information will not be put into the candidate list. The number of MV in the candidate list can be a fixed number. If the candidate list is not full, the artificial motion information can be inserted. For example, one list MV of a candidate can be selected. The mirroring MV of this selected MV in the other list can be generated by MV scaling. The selected MV and the scaled MV can be one of the artificial motion information. In another embodiment, the combined MV pair can be used as the artificial motion information. For example, the LIST_M MV of candidate-O, and the LIST_N MV of candidate-P can be the artificial motion information, where the M and N can be (0, 1) or (1, 0) and the O and P are different integer.

Modified Merge Candidate List for Decoder Side MV Refinement

When a Merge candidate is a bi-prediction candidate or a true-bi-prediction candidate, the DMVR can be applied to refine the predictor. The bi-prediction candidate or the true-bi-prediction candidate might be better than the uni-prediction candidate when the decoder side MV refinement is applied. However, not every candidate in the merge candidate list is a bi-prediction candidate or a true-bi-prediction candidate. Therefore, it is proposed to move the bi-prediction candidate or the true-bi-prediction forward. In one embodiment, all the bi-prediction candidates or the true-bi-prediction candidates are moved in front of the other candidates. In another embodiment, the bi-prediction candidates or the true-bi-prediction candidates are moved in forward for K position, where the K can be 1. In another embodiment, the first bi-prediction candidates or the first true-bi-prediction candidates of the successive bi-prediction candidates is moved forward for K position, where the K can be 1. For example, if the candidate 2, 3, 4, and 5 are the true bi-prediction candidates. The candidate 2 is swapped with the candidate 1.

Figure 16:
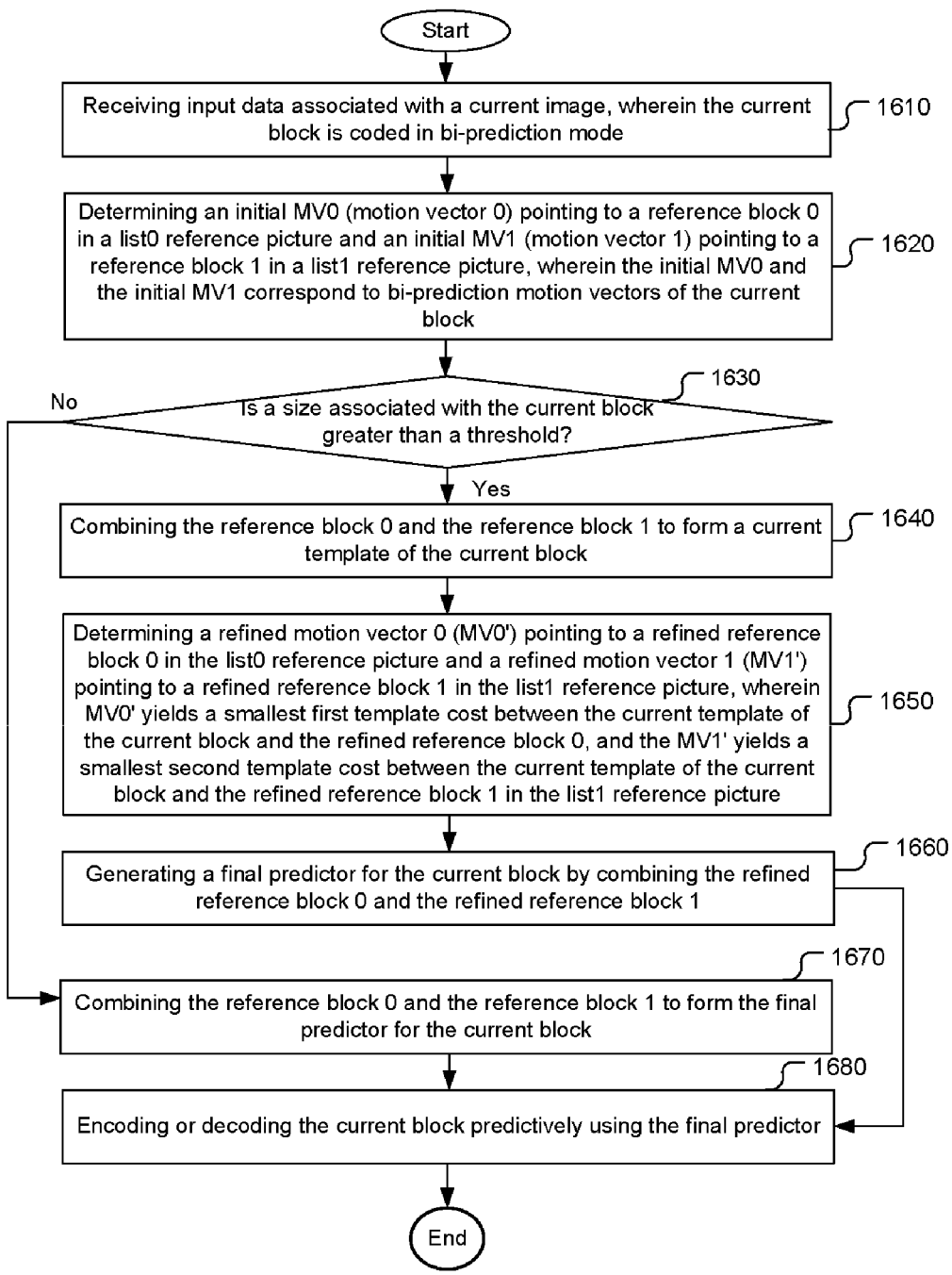
FIG. 16 illustrates an exemplary flowchart of a video coding system using block size dependent Bilateral Template MV Refinement according to an embodiment of the present invention.

FIG. 16 illustrates an exemplary flowchart of a video coding system using block size dependent Bilateral Template MV Refinement according to an embodiment of the present invention. The steps shown in the flowchart, as well as other flowcharts in this disclosure, may be implemented as program codes executable on one or more processors (e.g., one or more CPUs) at the encoder side and/or the decoder side. The steps shown in the flowchart may also be implemented based on hardware such as one or more electronic devices or processors arranged to perform the steps in the flowchart. According to this method, input data associated with a current block in a current picture is received in step 1610, where the current block is coded using bi-direction prediction. An initial MV0 (motion vector 0) pointing to a reference block 0 in a list0 reference picture and an initial MV1 (motion vector 1) pointing to a reference block 1 in a list1 reference picture are determined in step 1620, where the initial MV0 and the initial MV1 correspond to bi-prediction motion vectors of the current block.

Whether a size associated with the current block is greater than a threshold is checked in step 1630. If the test result is "yes" (i.e., the size associated with the current block being greater than the threshold), steps 1640 to 1660 are performed. Otherwise (i. e., the "no" path from step 1630), step 1670 is performed. In step 1640, the reference block 0 and the reference block 1 are combined to form a current template of the current block. In step 1650, determining a refined motion vector 0 (MV0') pointing to a refined reference block 0 in the list0 reference picture and a refined motion vector 1 (MV1') pointing to a refined reference block 1 in the list1 reference picture, where MV0' yields a smallest first template cost between the current template of the current block and the refined reference block 0, and the MV1' yields a smallest second template cost between the current template of the current block and the refined reference block 1 in the list1 reference picture. In step 1660, a final predictor is generated for the current block by combining the refined reference block 0 and the refined reference block 1. In step 1670, the reference block 0 and the reference block 1 are combined to form the final predictor for the current block. In step 1680, the current block is predictively encoded or decoded using the final predictor.

Figure 17:
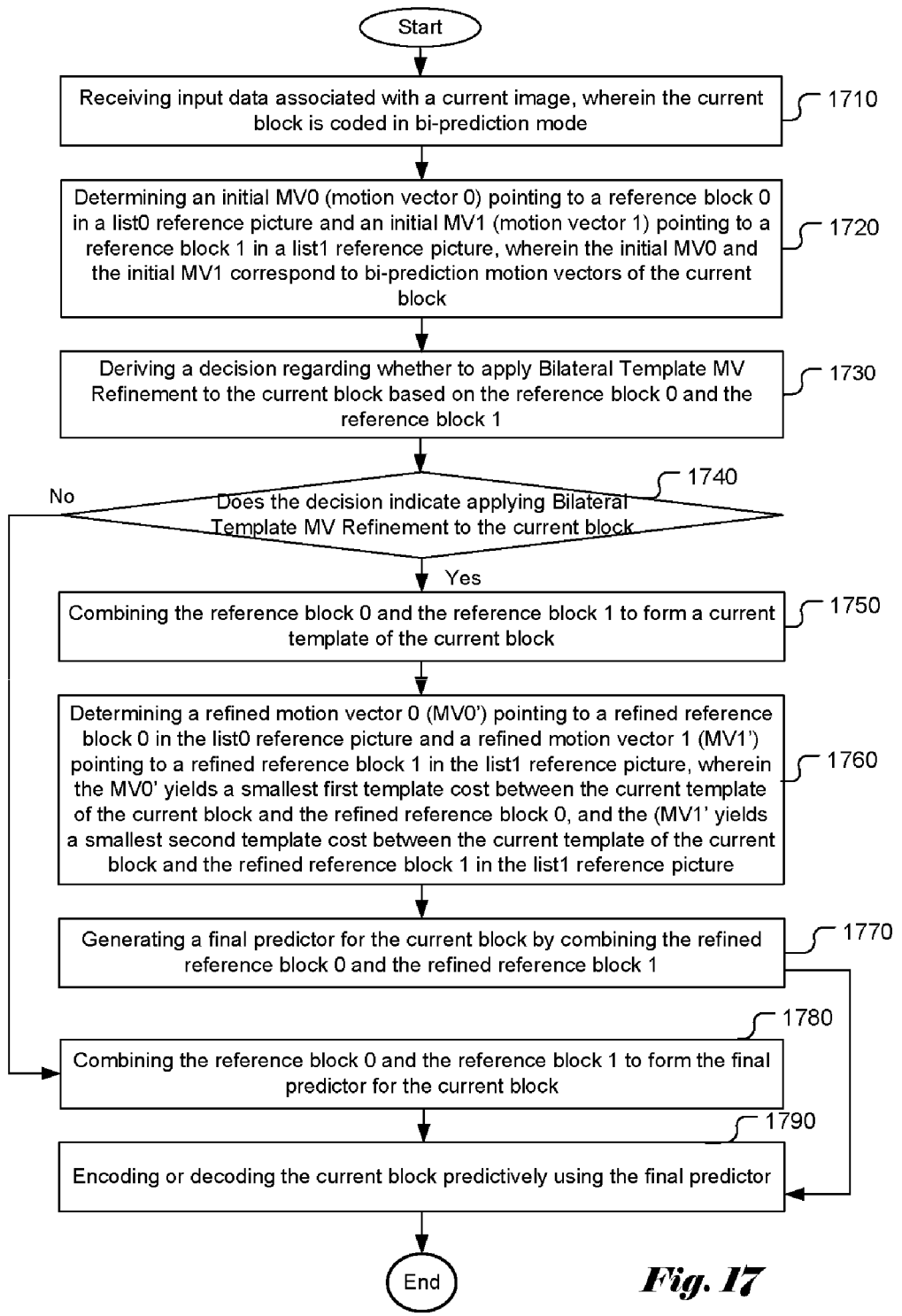
FIG. 17 illustrates an exemplary flowchart of a video coding system using Implicitly Switched Bilateral Template MV Refinement according to an embodiment of the present invention.

FIG. 17 illustrates an exemplary flowchart of a video coding system using Implicitly Switched Bilateral Template MV Refinement according to an embodiment of the present invention. According to this method, input data associated with a current block in a current picture is received in step 1710, where the current block is coded using bi-direction prediction. An initial MV0 (motion vector 0) pointing to a reference block 0 in a list0 reference picture and an initial MV1 (motion vector 1) pointing to a reference block 1 in a list1 reference picture are determined in step 1720, where the initial MV0 and the initial MV1 correspond to bi-prediction motion vectors of the current block. A decision regarding whether to apply Bilateral Template MV Refinement to the current block is determined based on the reference block 0 and the reference block 1 in step 1730. Whether the decision indicates applying Bilateral Template MV Refinement to the current block is checked in step 1740. If the test result is "yes" (i.e., applying Bilateral Template MV Refinement to the current block), steps 1750 to 1770 are performed. Otherwise (i. e., the "no" path from step 1740), step 1780 is performed. In step 1750, the reference block 0 and the reference block 1 are combined to form a current template of the current block. In step 1760, determining a refined motion vector 0 (MV0') pointing to a refined reference block 0 in the list0 reference picture and a refined motion vector 1 (MV1') pointing to a refined reference block 1 in the list0 reference picture, where MV0' yields a smallest first template cost between the current template of the current block and the refined reference block 0, and the MV1' yields a smallest second template cost between the current template of the current block and the refined reference block 1 in the list1 reference picture. In step 1770, a final predictor is generated for the current block by combining the refined reference block 0 and the refined reference block 1. In step 17870, the reference block 0 and the reference block 1 are combined to form the final predictor for the current block. In step 1790, the current block is predictively encoded or decoded using the final predictor.

Figure 18:
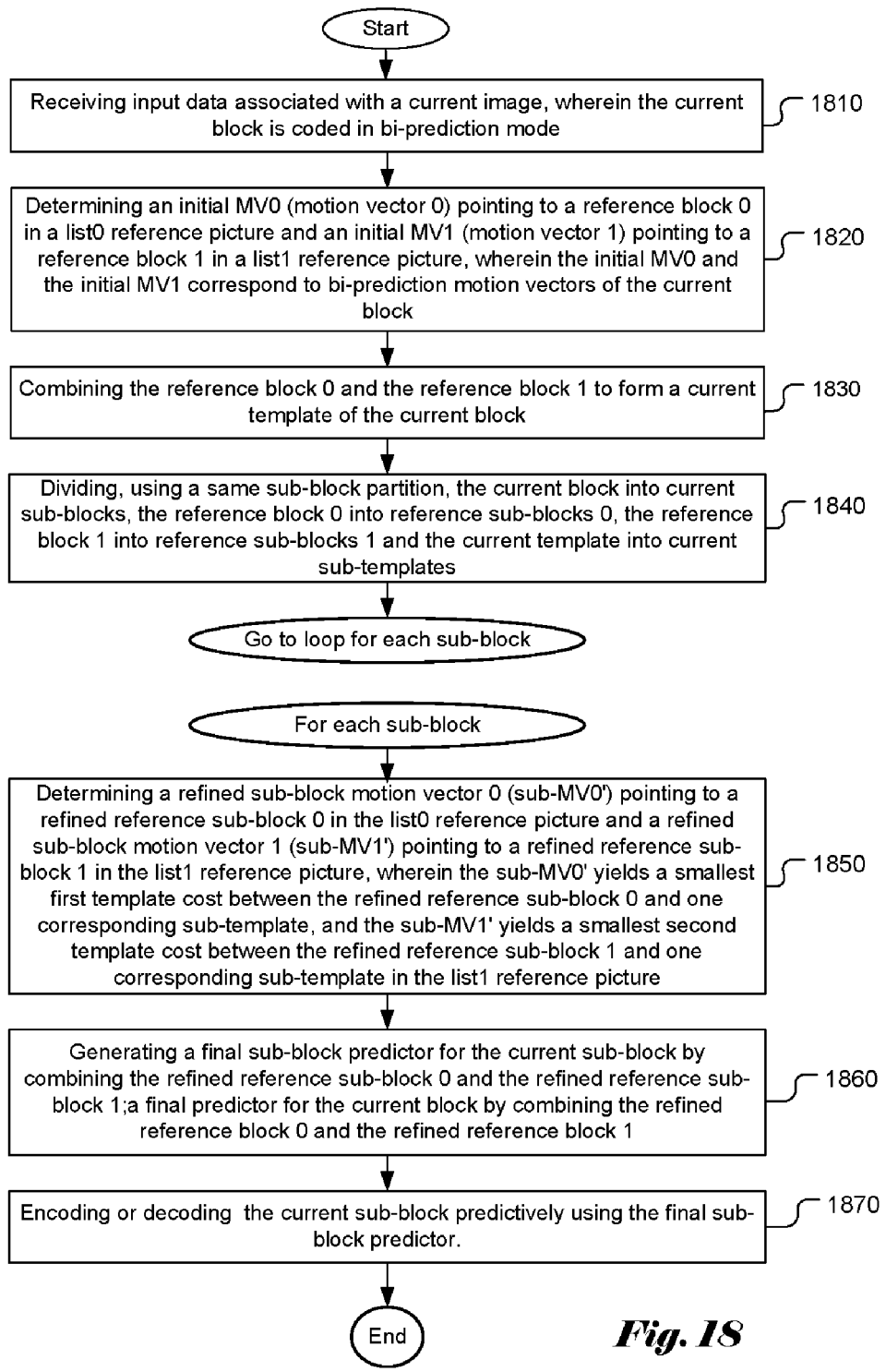
FIG. 18 illustrates an exemplary flowchart of a video coding system using sub-block based Bilateral Template MV Refinement according to an embodiment of the present invention.

FIG. 18 illustrates an exemplary flowchart of a video coding system using sub-block based Bilateral Template MV Refinement according to an embodiment of the present invention. According to this method, input data associated with a current block in a current picture is received in step 1810, where the current block is coded using bi-direction prediction. An initial MV0 (motion vector 0) pointing to a reference block 0 in a list0 reference picture and an initial MV1 (motion vector 1) pointing to a reference block 1 in a list1 reference picture are determined in step 1820, where the initial MV0 and the initial MV1 correspond to bi-prediction motion vectors of the current block. The reference block 0 and the reference block 1 are combined to form a current template for the current block in step 1830. The current block is divided into current sub-blocks, the reference block 0 is divided into reference sub-blocks 0, the reference block 1 is divided into reference sub-blocks 1 and the current template is divided into current sub-templates using a same sub-block partition in step 1840. After dividing into sub-blocks, steps 1850 to 1870 are applied to each sub-block. In step 1850, a refined sub-block motion vector 0 (sub-MV0') pointing to a refined reference sub-block 0 in the list0 reference picture and a refined sub-block motion vector 1 (sub-MV1') pointing to a refined reference sub-block 1 in the list1 reference picture are determined, wherein the sub-MV0' yields a smallest first template cost between the refined reference sub-block 0 and one corresponding sub-template, and the sub-MV1' yields a smallest second template cost between the refined reference sub-block 1 and one corresponding sub-template in the list1 reference picture. In step 1860, a final sub-block predictor is generated for the current sub-block by combining the refined reference sub-block 0 and the refined reference sub-block 1. In step 1870 the current sub-block is predictively encoded or decoded using the final sub-block predictor.

Figure 19:
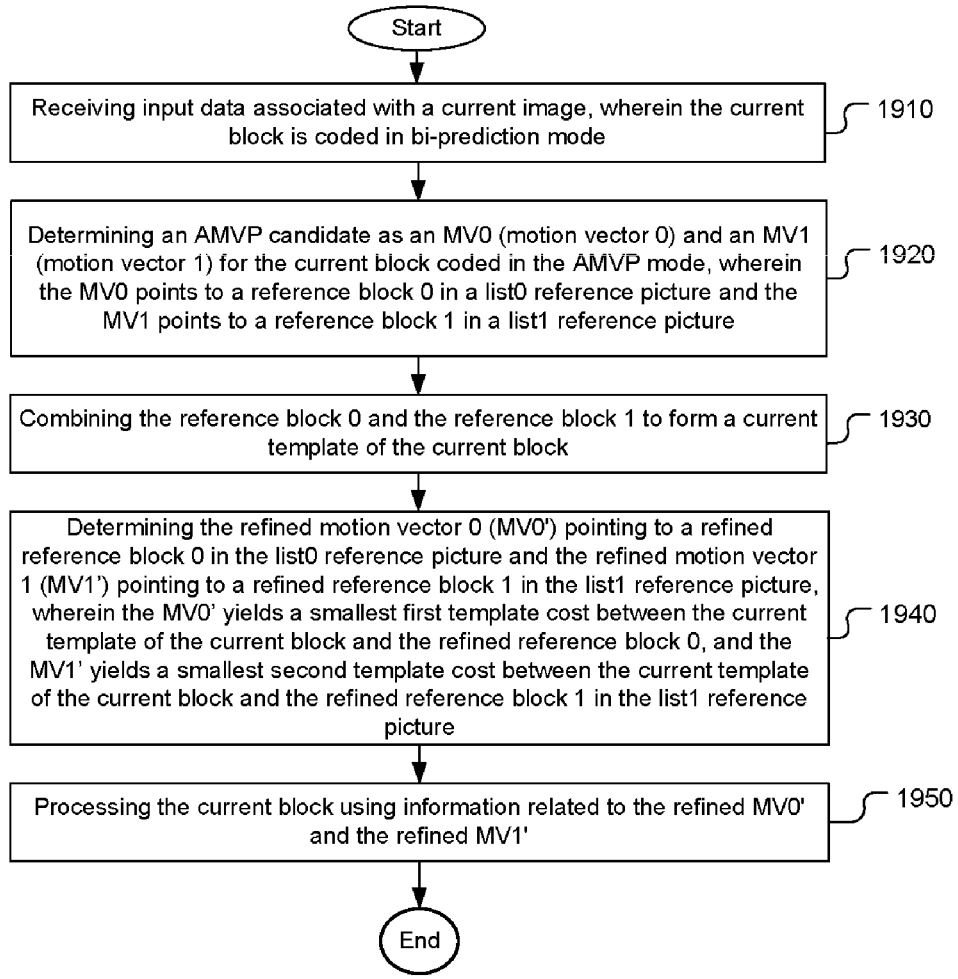
FIG. 19 illustrates an exemplary flowchart of a video coding system using Bilateral Template MV Refinement for AMVP (advanced MV prediction) mode according to an embodiment of the present invention.

FIG. 19 illustrates an exemplary flowchart of a video coding system using Bilateral Template MV Refinement for AMVP (advanced MV prediction) mode according to an embodiment of the present invention. According to this method, input data associated with a current block in a current picture is received in step 1910, where the current block is coded using bi-direction prediction. An AMVP candidate as an MV0 (motion vector 0) and an MV1 (motion vector 1) for the current block are determined in step 1920, wherein the MV0 points to a reference block 0 in a list0 reference picture and the MV1 points to a reference block 1 in a list1 reference picture. The reference block 0 and the reference block 1 are combined to form a current template of the current block in step 1930. The refined motion vector 0 (MV0') pointing to a refined reference block 0 in the list0 reference picture and the refined motion vector 1 (MV1') pointing to a refined reference block 1 in the list1 reference picture are determined in step 1940, wherein the MV0' yields a smallest first template cost between the current template of the current block and the refined reference block 0, and the MV1' yields a smallest second template cost between the current template of the current block and the refined reference block 1 in the list1 reference picture. The current block is processed using information related to the refined MV0' and the refined MV1' in step 1950.

Figure 20:
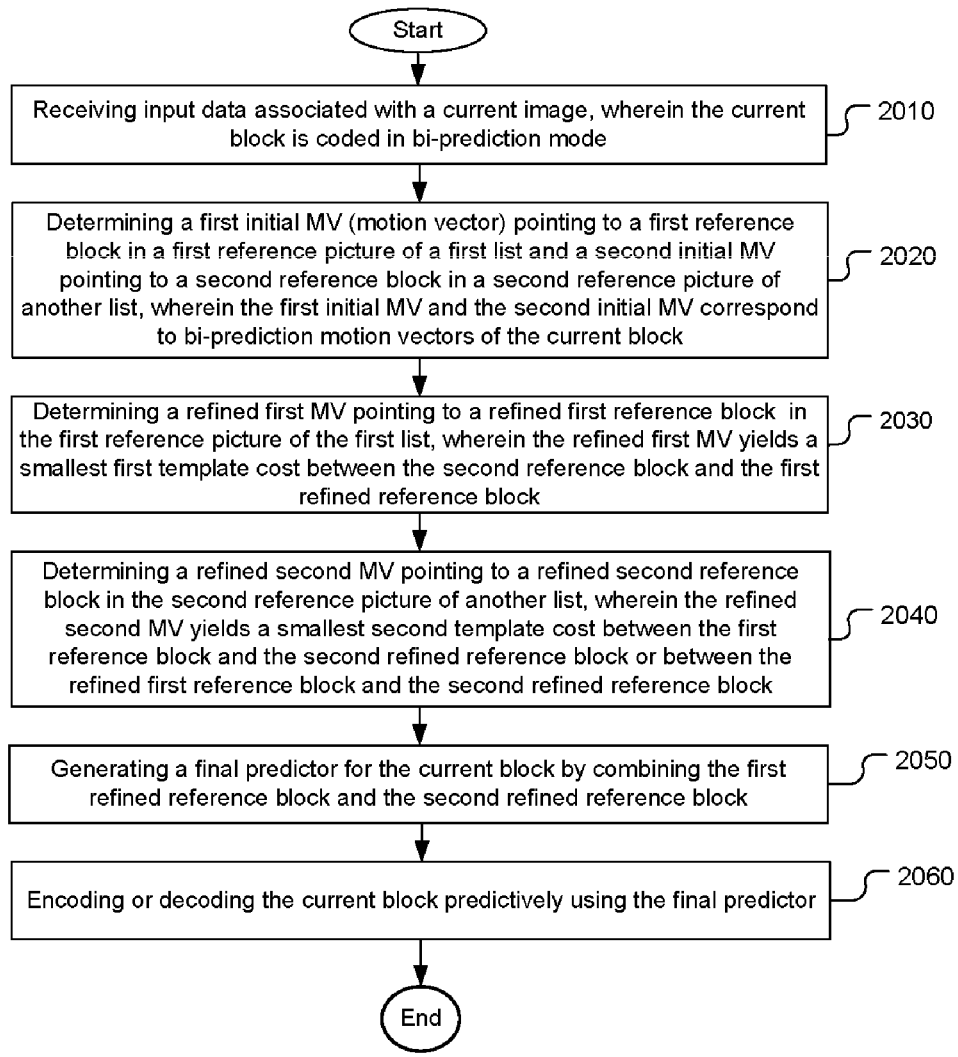
FIG. 20 illustrates an exemplary flowchart of a video coding system using Template-Modified Bilateral Template MV Refinement according to an embodiment of the present invention.

FIG. 20 illustrates an exemplary flowchart of a video coding system using Template-Modified Bilateral Template MV Refinement according to an embodiment of the present invention. According to this method, input data associated with a current block in a current picture is received in step 2010, where the current block is coded using bi-direction prediction. A first initial MV (motion vector) pointing to a first reference block in a first reference picture of a first list and a second initial MV pointing to a second reference block in a second reference picture of another list are determined in step 2020, wherein the first initial MV and the second initial MV correspond to bi-prediction motion vectors of the current block. A refined first MV pointing to a refined first reference block in the first reference picture of the first list is determined in step 2030, wherein the refined first MV yields a smallest first template cost between the second reference block and the first refined reference block. A refined second MV pointing to a refined second reference block in the second reference picture of another list is determined in step 2040, wherein the refined second MV yields a smallest second template cost between the first reference block and the second refined reference block or between the refined first reference block and the second refined reference block. A final predictor is generated for the current block by combining the first refined reference block and the second refined reference block in step 2050. The current block is predictively encoded or decoded using the final predictor in step 2060.

The flowcharts shown above are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:
receiving input data associated with a current block in a current picture, wherein the current block is coded in a bi-prediction mode;
determining an initial MV0 (motion vector 0) pointing to a reference block 0 in a list0 reference picture and an initial MV1 (motion vector 1) pointing to a reference block 1 in a list1 reference picture, wherein the initial MV0 and the initial MV1 correspond to bi-prediction motion vectors of the current block;
determining whether a size of the current block is greater than a threshold;
in a case that the size of the current block is determined not to be greater than the threshold:
performing a bi-prediction of the current sub-block using the reference block 0 and the reference block 1; and
in a case that the size of the current block is determined to be greater than the threshold:
dividing the current block into current sub-blocks; and
for each sub-block of the current sub-blocks:
determining, according to the initial MV0 and the initial MV1, a refined sub-block motion vector 0 (sub-MV0') pointing to a refined reference sub-block 0 in the list0 reference picture and a refined sub-block motion vector 1 (sub-MV1') pointing to a refined reference sub-block 1 in the list reference picture, and
performing the bi-prediction of the sub-block of the current sub-blocks according to the refined reference sub-block 0 and the refined reference sub-block 1.

2. The method of claim 1, wherein a flag is signalled in a sequence level, picture level, slice level, or PU level to indicate whether sub-block Bilateral Template MV Refinement is enabled.

3. The method of claim 1, wherein
a same sub-block partition is used to divide each block of the current picture into corresponding sub-blocks having a sub-block width and a sub-block height, and
information associated with the sub-block width and the sub-block height is signalled in a sequence level, picture level, slice level, or PU level.

4. The method of claim 1, wherein the determining the refined sub-block motion vector 0 (sub-MV0') and the refined sub-block motion vector 1 (sub-MV1') comprises:
deriving a template block according to the initial MV0 and the initial MV1; and
deriving the refined sub-block motion vector 0 and the refined sub-block motion vector 1 by performing motion estimation on the template block to identifying the refined reference sub-block 0 in the list 0 reference picture and identifying the refined reference sub-block 1 in the list 1 reference picture.

5. The method of claim 1, wherein the determining the refined sub-block motion vector 0 (sub-MV0') and the refined sub-block motion vector 1 (sub-MV1') comprises:

performing a diamond search of motion vector pairs, starting with the initial MV0 and the initial MV1, based on matching a neighboring template of the corresponding current sub-block.

6. An apparatus of video coding, the apparatus comprising one or more electronic circuits or processors configured to:
receive input data associated with a current block in a current picture, wherein the current block is coded in a bi-prediction mode;
determine an initial MV0 (motion vector 0) pointing to a reference block 0 in a list0 reference picture and an initial MV1 (motion vector 1) pointing to a reference block 1 in a list1 reference picture, wherein the initial MV0 and the initial MV1 correspond to bi-prediction motion vectors of the current block;
determine whether a size of the current block is greater than a threshold;
in a case that the size of the current block is determined not to be greater than the threshold:
perform a bi-prediction of the current sub-block using the reference block 0 and the reference block 1; and
in a case that the size of the current block is determined to be greater than the threshold:
divide the current block into current sub-blocks; and
for each sub-block of the current sub-blocks:
determine, according to the initial MV0 and the initial MV1, a refined sub-block motion vector 0 (sub-MV0') pointing to a refined reference sub-block 0 in the list0 reference picture and a refined sub-block motion vector 1 (sub-MV1') pointing to a refined reference sub-block 1 in the list 1 reference picture, and
perform the bi-prediction of the sub-block of the current sub-blocks according to the refined reference sub-block 0 and the refined reference sub-block 1.

7. A method of video coding, the method comprising:
receiving input data associated with a current block in a current picture, wherein the current block is coded in a bi-prediction mode;
determining an initial MV0 (motion vector 0) pointing to a reference block 0 in a list0 reference picture and an initial MV1 (motion vector 1) pointing to a reference block 1 in a list1 reference picture, wherein the initial MV0 and the initial MV1 correspond to bi-prediction motion vectors of the current block;
determining a measurement value that represents a difference between the reference block 0 and the reference block 1;
determining whether the measurement value is greater than a threshold;
in a case that the measurement value is determined to be greater than the threshold:
performing a bi-prediction of the current block according to the reference block 0 and the reference block 1; and
in a case that that the measurement value is determined not to be greater than the threshold:
determining a refined motion vector 0 (MV0') pointing to a refined reference block 0 in the list0 reference picture and a refined motion vector 1 (MV1') pointing to a refined reference block 1 in the list reference picture that correspond to a reduced template cost than the initial MV0 and the initial MV1, and
performing the bi-prediction of the current block according to the refined reference block 0 and the refined reference block 1.

* * * * *